United States Patent [19]

Furukawa et al.

[11] Patent Number: 5,757,871
[45] Date of Patent: May 26, 1998

[54] JITTER SUPPRESSION CIRCUIT FOR CLOCK SIGNALS USED FOR SENDING DATA FROM A SYNCHRONOUS TRANSMISSION NETWORK TO AN ASYNCHRONOUS TRANSMISSION NETWORK

[75] Inventors: Takahiro Furukawa, Oyama; Masahiro Shinbashi, Kawasaki, both of Japan

[73] Assignee: Fujitsu Limited, Kanagawa, Japan

[21] Appl. No.: 314,944

[22] Filed: Sep. 29, 1994

[30] Foreign Application Priority Data

Mar. 18, 1994 [JP] Japan .................... 6-048196

[51] Int. Cl.$^6$ .................... H04L 7/00; H04L 25/36
[52] U.S. Cl. .................... 375/372; 375/375; 370/102; 370/108
[58] Field of Search .................... 375/263, 354, 375/355, 371, 372, 375; 370/102, 108; 331/57; 327/105

[56] References Cited

U.S. PATENT DOCUMENTS

| | | | |
|---|---|---|---|
| 4,596,026 | 6/1986 | Cease et al. | 375/372 |
| 4,920,547 | 4/1990 | Murakami | 375/372 |
| 5,268,937 | 12/1993 | Marbot | 370/108 |
| 5,442,664 | 8/1995 | Rust et al. | 370/108 |
| 5,488,639 | 1/1996 | MacWilliams et al. | 375/355 |

FOREIGN PATENT DOCUMENTS 4196937  7/1992  Japan .

*Primary Examiner*—Stephen Chin
*Assistant Examiner*—Don Vo

[57] ABSTRACT

A jitter suppression circuit for a synchronous transmission network has a write clock generator for carrying out positive or negative stuffing, a buffer memory for storing data related to the main signals, a byte-bit converter, a clock mask, an N-phase clock generator, a read clock generator, and a smoothing unit. The byte-bit converter has an accumulator for accumulating bits related to the positive or negative stuffing according to the byte stuffing signal and a distributor for distributing the accumulated bits according to a moving average for a predetermined period, to generate smoothed bit stuffing signals. The clock mask masks clock signals corresponding to overhead bytes among the received clock signals. The N-phase clock generator divides the period of the output clock signal of the clock mask by N, to generate N-phase clock signals. The read clock generator sequentially selects the N-phase clock signals according to the bit stuffing signals, to generate clock signals for reading the buffer memory. The smoothing unit reads the data stored in the buffer memory according to the clock signals generated by the read clock generator while smoothing the masked clock signals corresponding to the overhead signals, and saves the smoothed read data for an asynchronous transmission network.

15 Claims, 24 Drawing Sheets

Fig.14

| | (a) | (b) | (c) | (d) | (e) | (f) | (g) | (h) | (i) | (j) | (k) | (l) | (m) | (n) | (o) | (p) | (q) | (r) | (s) | (t) | (u) | (v) | (w) | (x) | (y) | (z) | REMARKS |
|---|---|---|---|---|---|---|---|---|---|---|---|---|---|---|---|---|---|---|---|---|---|---|---|---|---|---|---|
| OUTPUT OF PHASE DETECTOR 6c | 1 | 1 | 1 | 1 | 1 | 1 | 1 | 1 | 1 | 0 | X | 0 | 0 | 0 | 0 | 0 | 0 | 0 | 0 | X | 1 | 1 | 1 | 1 | 1 | 1 | SIGNALS (t) TO (z) INVOLVE SHIFTS OF 3 PERIODS OR MORE |
| OUTPUT OF PHASE DETERMINATION UNIT 6f | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | ALL SIGNALS FOLLOWING FIRST ZERO ARE ZEROED |
| OUTPUT OF SELECT SIGNAL GENERATOR 6d | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | ALL SIGNALS PRECEDING HIGHEST 1 ARE ZEROED |
| OUTPUT OF SELECT SIGNAL PROCESSOR 6g | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | LEVEL IS CHANGED AT OVERHEAD BYTE POSITION |

X : INDEFINITE STATE

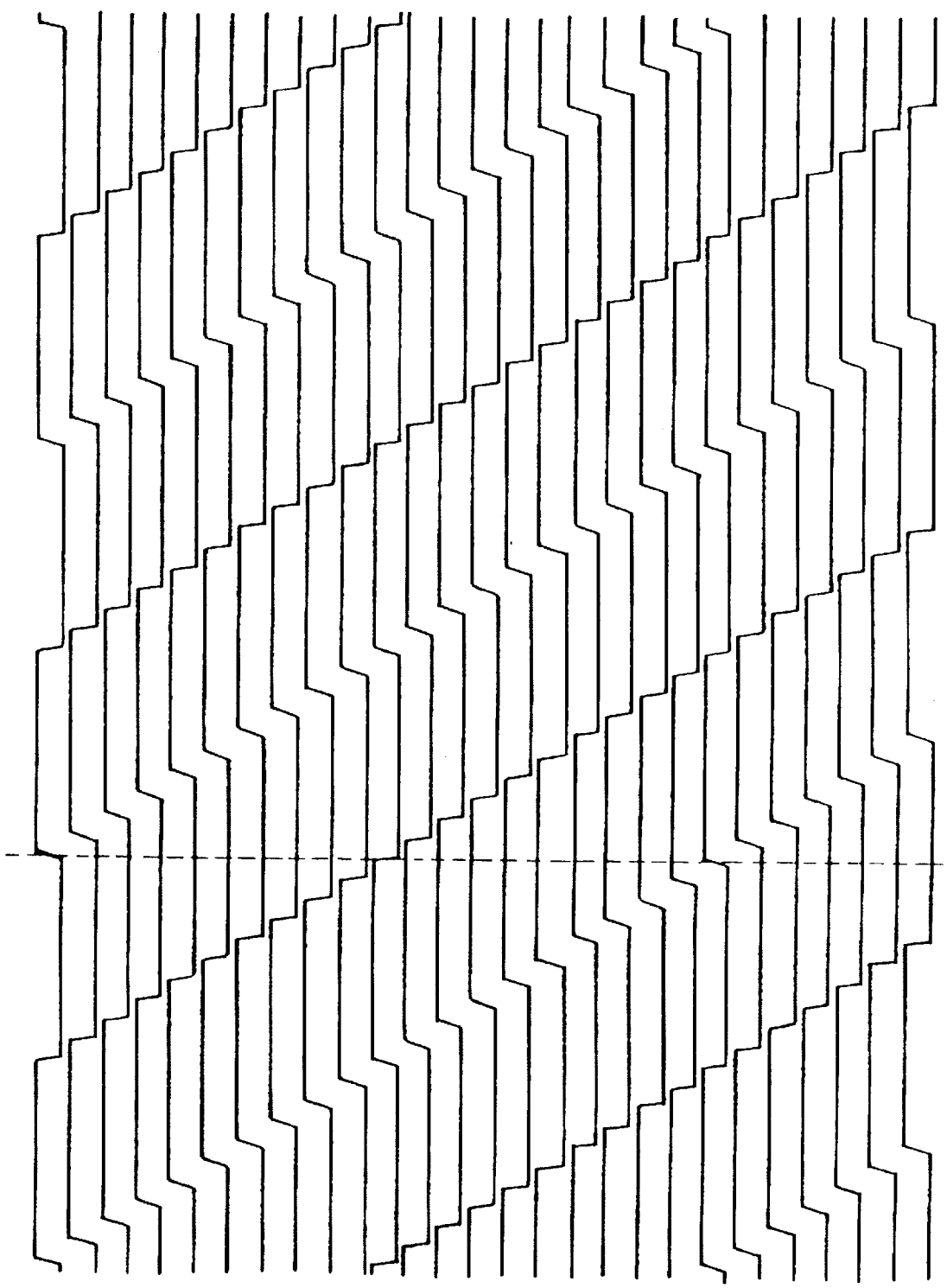

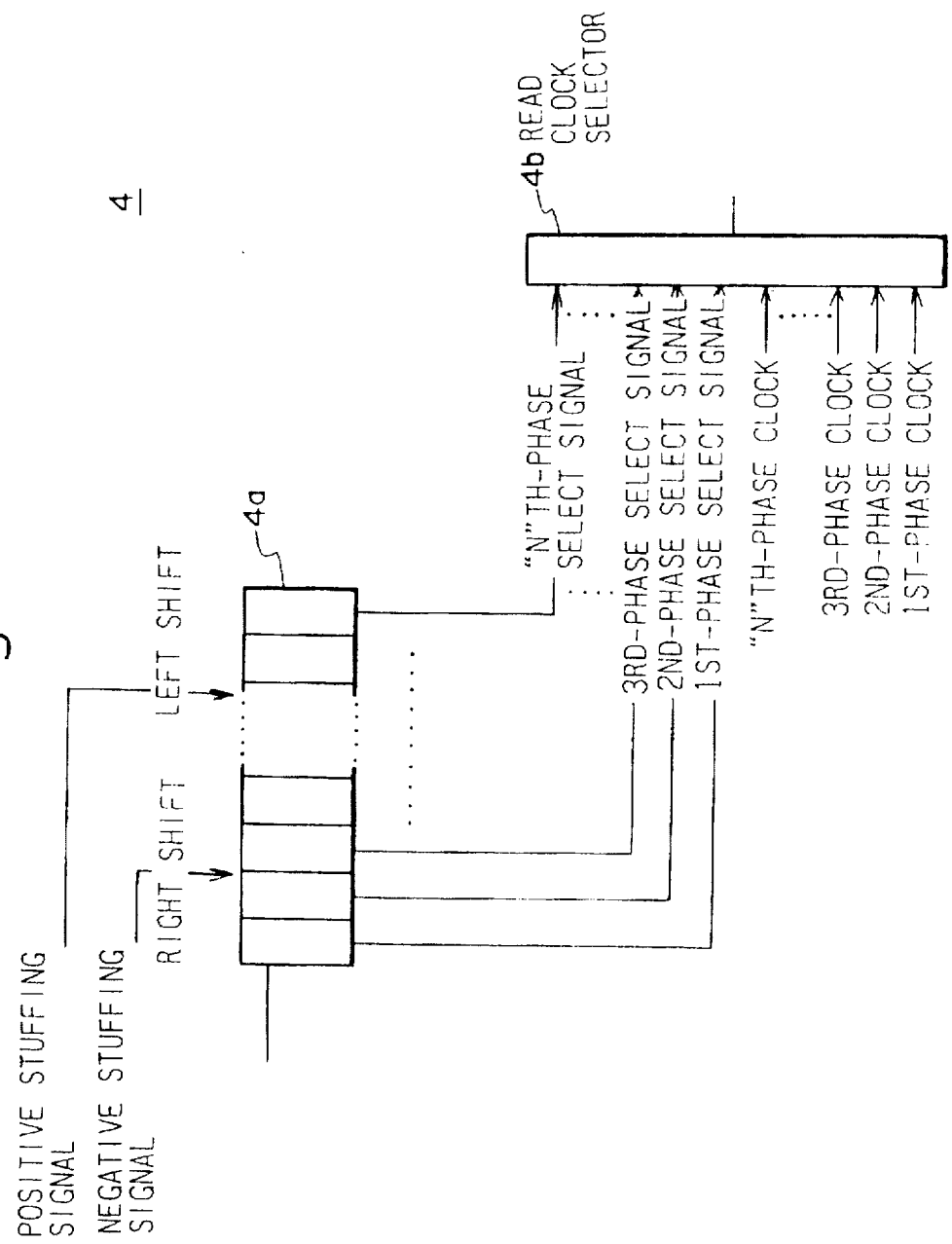

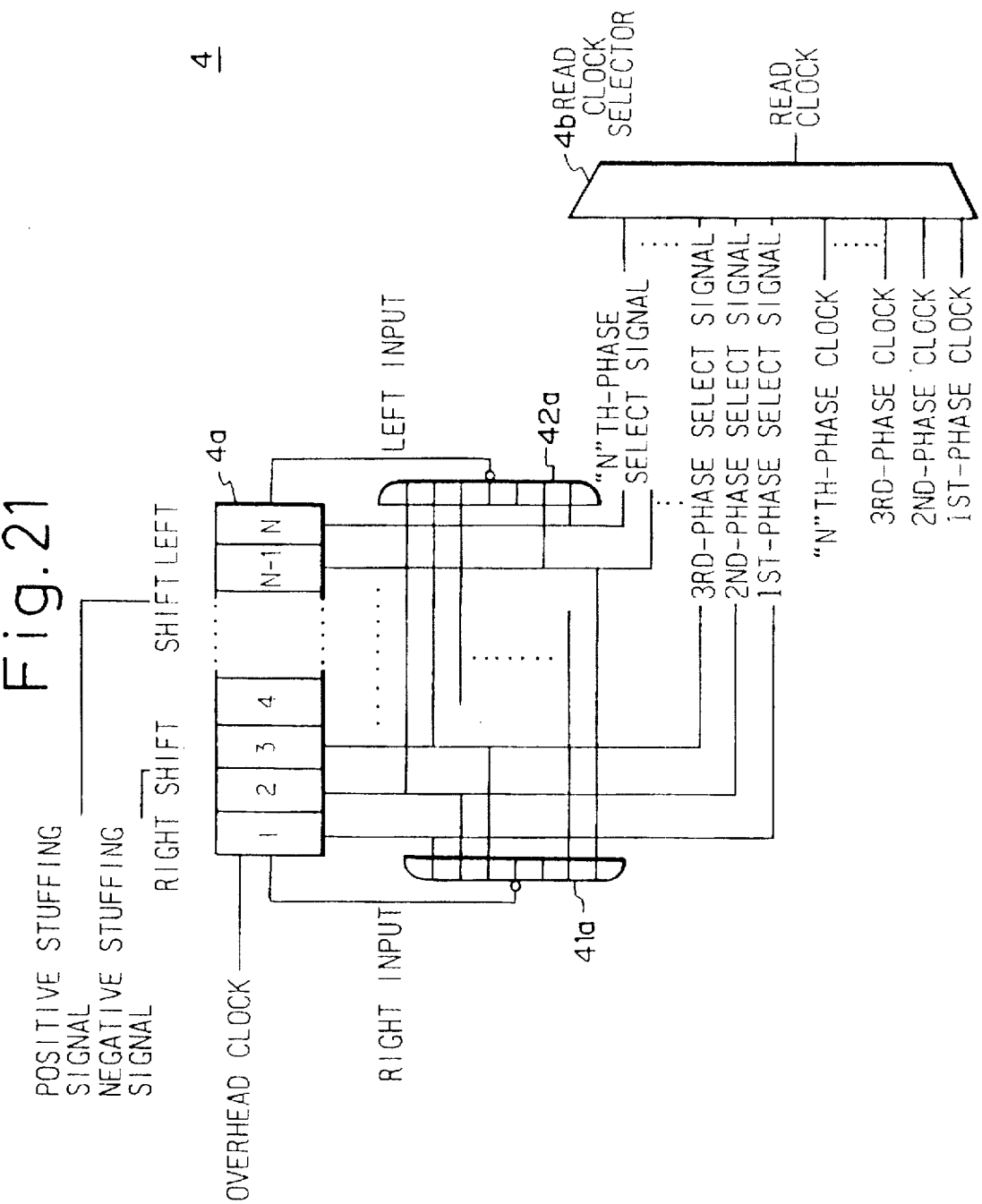

5,757,871

1

JITTER SUPPRESSION CIRCUIT FOR CLOCK SIGNALS USED FOR SENDING DATA FROM A SYNCHRONOUS TRANSMISSION NETWORK TO AN ASYNCHRONOUS TRANSMISSION NETWORK

BACKGROUND OF THE INVENTION

1. Field of the Invention

The present invention relates to a jitter suppression circuit, and particularly, to a jitter suppression circuit for clock signals used for sending data from a synchronous transmission network to an asynchronous transmission network.

2. Description of the Related Art

A transmission network such as SONET (Synchronous Optical Network) employs a byte-bit converter for converting a byte-stuffing signal into bit-stuffing signals without using a digital PLL circuit. For such bit stuffing, a jitter suppression circuit is required to reduce phase fluctuations and jitter.

The synchronous transmission network receives data from an asynchronous transmission network and returns the data to the asynchronous transmission network according to clock signals from a standardized clock source. For example, the SONET has two terminals connected to the asynchronous transmission network, and an add-drop multiplexer (ADM) between these two terminals. One of the two terminals receives asynchronously transmitted data, maps (synchronizes) the data into an SPE (Synchronous Payload Envelope) that matches a SONET frame, adds an initial pointer value to the data, and sends the data to the ADM.

The pointer is used to correctly transmit and receive the SPEs even if phase fluctuations occur between the one terminal and the ADM. The pointer indicates the start of the SPE in the subframe. If the phase of the SPE prepared using the timing of the one terminal differs from that prepared using the timing of the ADM, the pointer may be changed by ±1.

Note that changing the pointer by +1 is called positive stuffing, and changing the pointer by −1 is called negative stuffing. Positive stuffing and negative stuffing are generally called byte stuffing. Byte stuffing must not be carried out at intervals of less than four frames according to SONET standards.

In the prior art, for example, when no byte stuffing is carried out, the signal for masking the first three bytes is provided as it is. The 24th bit is inserted or the 25th bit is omitted in a subframe corresponding to a bit stuffing signal generated by the byte-bit converter. The bits to be omitted or inserted are not necessarily the 24th and 25th bits. Any other bits may be omitted or inserted. Japanese Unexamined Patent Publication (Kokai) No. 4-196937 discloses a byte-bit converter, i.e., a jitter suppression circuit employing no digital PLL circuit to provide bit stuffing signals. Note that the conventional jitter suppression circuit and the problems thereof will be described later in detailed with reference to accompanying drawings.

SUMMARY OF THE INVENTION

An object of the present invention is to reduce phase fluctuations and jitter due to bit stuffing. Another object of the present invention is to provide a clock generator (an N-phase clock generator) for generating a high-frequency clock signal according to an ordinary clock signal, by using gate delays.

2

According to the present invention, there is provided a jitter suppression circuit for a synchronous transmission network, comprising a write clock generator for masking clock signals corresponding to overhead signals among received data and clock signals, carrying out positive or negative stuffing according to a byte stuffing signal contained in the received data signals, and generating clock signals corresponding only to main signals contained in the received data signals; a buffer memory for storing data related to the main signals in response to the clock signals generated by the write clock generator; a byte-bit converter having an accumulator for accumulating bits related to the positive or negative stuffing according to the byte stuffing signal and a distributor for distributing the accumulated bits according to a moving average for a predetermined period, to generate smoothed bit stuffing signals; a clock mask for masking clock signals corresponding to overhead bytes among the received clock signals; an N-phase clock generator for dividing the period of the output clock signal of the clock mask by N, to generate N-phase clock signals; a read clock generator for sequentially selecting the N-phase clock signals according to the bit stuffing signals, to generate clock signals for reading the buffer memory; and a smoothing unit for reading the data stored in the buffer memory according to the clock signals generated by the read clock generator while smoothing the masked clock signals corresponding to the overhead signals, and saving the smoothed read data for an asynchronous transmission network.

The N-phase clock generator may include a phase delay unit having gates for delaying the phase of an input clock signal; a frequency divider for halving the frequency of the output of each of predetermined ones of the gates of the phase delay unit; a phase detector for detecting any of the gates that provides a clock signal that is delayed behind the input clock signal by one period of the input clock signal or over; a select signal generator for converting only a first detected output from the phase detector into a select signal; and an N-phase clock selector for selecting, according to the select signal, those of the gates that divide the period of the input clock signal into N phases.

The N-phase clock generator may further have a select signal processor for adjusting the select signal of the select signal generator according to the position of the overhead bytes. The N-phase clock generator may further have a phase determination circuit disposed on the output side of the phase detector, to prevent providing a plurality of detected outputs.

The N-phase clock generator may include a phase delay unit having gates for delaying the phase of an input clock signal; a frequency divider for halving the frequency of the output of each of predetermined ones of the gates of the phase delay unit; a phase detector for detecting any of the gates that provides a clock signal that is delayed behind the input clock signal by half the period of the input clock signal or over; a select signal generator for converting only a first detected output from the phase detector into a select signal; and an N-phase clock selector for selecting, according to the select signal, those of the gates that divide the period of the input clock signal into N phases.

The read clock generator may include an N-stage ring counter shiftable to the right and left, operating in response to the bit stuffing signals; and a selector for selecting the N-phase clock signals one by one according to the output of the ring counter, to sequentially generate read clock signals. Further, the read clock generator may include an N-stage up/down counter operating in response to the bit stuffing signals; a decoder for decoding the output of the counter;

and a selector for selecting the N-phase clock signals one by one according to the output of the decoder, to sequentially generate read clock signals.

According to the present invention, there is also provided an N-phase clock generator for dividing the period of a clock signal by N, to generate N-phase clock signals, comprising a phase delay unit having gates for delaying the phase of an input clock signal; a frequency divider for halving the frequency of the output of each of predetermined ones of the gates of the phase delay unit; a phase detector for detecting any of the gates that provides a clock signal that is delayed behind the input clock signal by one period of the input clock signal or over; a select signal generator for converting only a first detected output from the phase detector into a select signal; and an N-phase clock selector for selecting, according to the select signal, those of the gates that divide the period of the input clock signal into N phases.

Further, according to the present invention, there is also provided an N-phase clock generator for dividing the period of a clock signal by N, to generate N-phase clock signals, comprising a phase delay unit having gates for delaying the phase of an input clock signal; a frequency divider for halving the frequency of the output of each of predetermined ones of the gates of the phase delay unit; a phase detector for detecting any of the gates that provides a clock signal that is delayed behind the input clock signal by half the period of the input clock signal or over; a select signal generator for converting only a first detected output from the phase detector into a select signal; and an N-phase clock selector for selecting, according to the select signal, those of the gates that divide the period of the input clock signal into N phases.

BRIEF DESCRIPTION OF THE DRAWINGS

The present invention will be more clearly understood from the description of the preferred embodiments as set forth below with reference to the accompanying drawings, wherein:

FIG. 14 shows an example of logic from a phase detector to a select signal processor in the N-phase clock generator of FIG. 12;

FIG. 15 is a timechart for explaining the phase detector of the N-phase clock generator of FIG. 12;

FIG. 18 is a block diagram showing the principle of a first example of a read clock generator in a jitter suppression circuit according to the present invention;

FIG. 21 is a block diagram showing a read clock generator in a jitter suppression circuit according to an embodiment of the present invention.

DESCRIPTION OF THE PREFERRED EMBODIMENTS

For a better understanding of the preferred embodiments, the problems of the related art will be explained, with reference to FIGS. 1 to 6.

Figure 1:
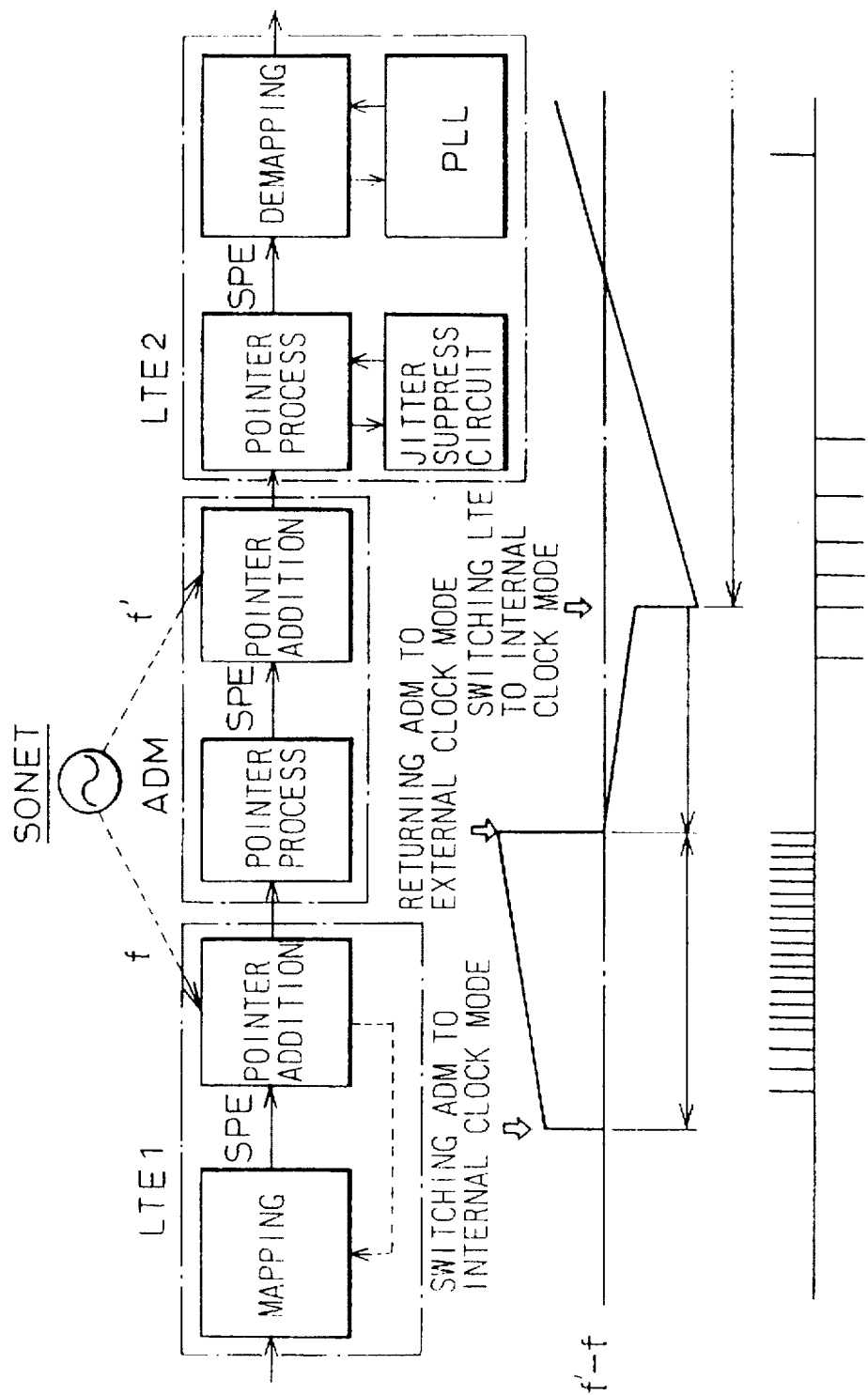
FIG. 1 is a block diagram showing an example of a SONET (Synchronous Optical Network)

FIG. 1 shows an example of a SONET (Synchronous Optical Network).

The synchronous transmission network receives data from an asynchronous transmission network and returns the data to an asynchronous transmission network according to clock signals from a standardized clock source BITS. The SONET of FIG. 1 has terminals LTE1 and LTE2 connected to the asynchronous transmission network, and an add-drop multiplexer ADM between the terminals LTE1 and LTE2. The terminal LTE1 receives asynchronously transmitted data, maps (synchronizes) the data into an SPE (Synchronous Payload Envelope) that matches a SONET frame, adds an initial pointer value to the data, and sends the data to the add-drop multiplexer ADM.

Figure 2A:
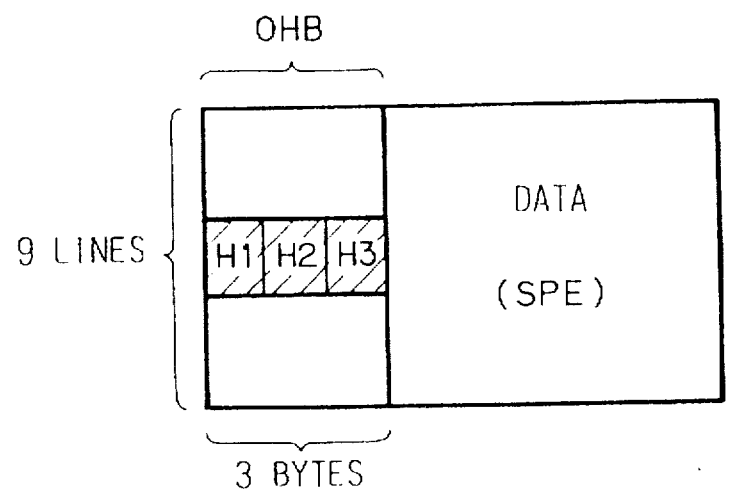
FIGS. 2A, 2B, and 2C are diagrams for explaining byte stuffing for synchronous transmission.
Figure 2B:
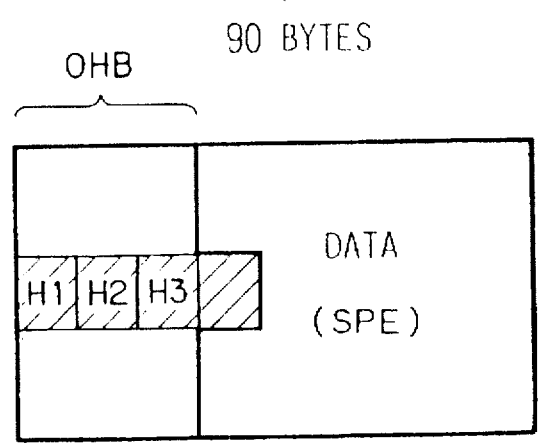
Figure 2C:
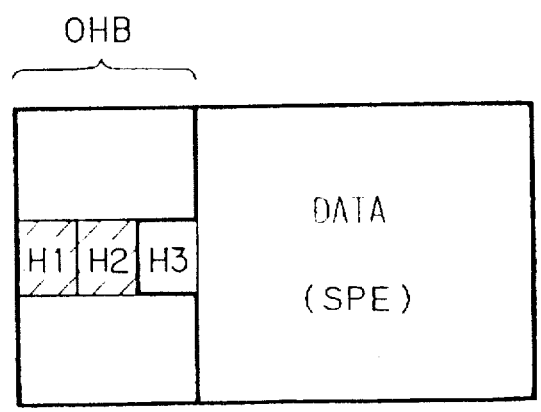
Figure 3:
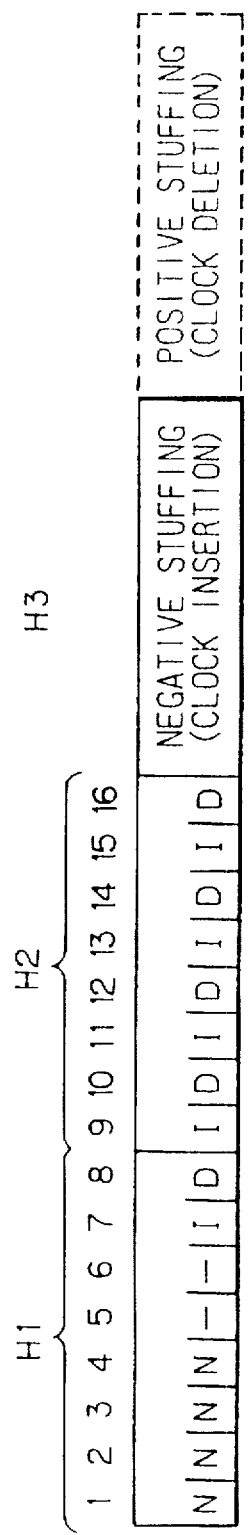
FIG. 3 is a diagram for explaining pointer actions for synchronous transmission.

FIGS. 2A to 2C explain byte stuffing and a frame format in a synchronous transmission network such as the SONET. FIG. 3 explains pointer actions in the synchronous transmission. A reference mark I is positive stuffing and D is negative stuffing.

FIG. 2A shows a multiframe that contains nine subframes each having 90 bytes. The first three bits of each subframe are overhead bytes (OHBs), as indicated with hatches. The three bytes H1 to H3 in the overhead bytes serve as a pointer. The remaining 87 bytes of each subframe form an SPE.

The pointer is used to correctly transmit and receive the SPEs even if phase fluctuations occur between the terminal LTE1 and the add-drop multiplexer ADM. Namely, the pointer allows the SPE to move freely in a subframe.

The pointer indicates the start of the SPE in the subframe. If the phase of the SPE prepared using the timing of the terminal LTE1 differs from the phase of the SPE prepared using the timing of the add-drop multiplexer ADM, the pointer may be changed by ±1.

Changing the pointer by +1 is called positive stuffing. If positive stuffing is carried out, the SPE in the corresponding frame starts from the second byte after the byte H3, as shown in FIGS. 2B and 3. Namely, the byte following the byte H3 is skipped. Changing the pointer by −1 is called negative stuffing. If negative stuffing is carried out, the SPE in the corresponding frame starts from the byte H2, as shown in FIGS. 2C and 3.

Positive stuffing and negative stuffing are generally called byte stuffing. Byte stuffing must not be carried out at intervals of less than four frames according to SONET standards.

Positive stuffing causes the terminal LTE2 to omit clock signals for the byte encircled with a dotted line in FIG. 3, just after the byte H3, and to extract only the SPE. Negative stuffing causes the terminal LTE2 to insert 8-bit clock signals in the byte H3, to extract only the SPE. The byte H3 usually contains no data. FIG. 2B shows a multiframe involving positive stuffing, and FIG. 2C shows a multiframe involving negative stuffing.

In this way, the add-drop multiplexer ADM decomposes a frame from the terminal LTE1, carries out a pointer process, prepares its own frame, adds a pointer to the frame, and sends the frame with data SPE. If there is a difference (phase difference) f-f' between the frequency f of the clock signals from the clock source BITS to the terminal LTE1 and the frequency f' from the clock source BITS to the add-drop multiplexer ADM, the add-drop multiplexer ADM carries out pointer actions as shown in FIG. 1. As the phase difference f-f' becomes greater, the pointer actions become more frequent.

The terminal LTE2 receives the frame on which the pointer actions have been carried out. At this time, omitted (masked) clock signals for the overhead bytes (each three bytes indicated with hatching in FIGS. 2A to 2C) may cause jitter. Accordingly, the terminal LTE2 must employ a PLL circuit to smooth the part where the clock signals have been omitted and to suppress the jitter. The jitter suppressed data are returned to the asynchronous transmission network.

In this way, the terminal LTE2 extracts only the SPE out of the data sent from the add-drop multiplexer ADM while smoothing the omitted clock signals corresponding to the overhead bytes. To smooth the omitted clock signals and suppress jitter, a conventional PLL circuit is sufficient because the frequency of the omitted clock signals is high, for example, 75 KHz.

The frequency of byte stuffing shown in FIGS. 2B and 2C, however, is low so that demapping is insufficient to suppress jitter due to the byte stuffing.

To solve this problem, the terminal LTE2 of FIG. 1 must employ a jitter suppression circuit for byte stuffing.

Figure 4:
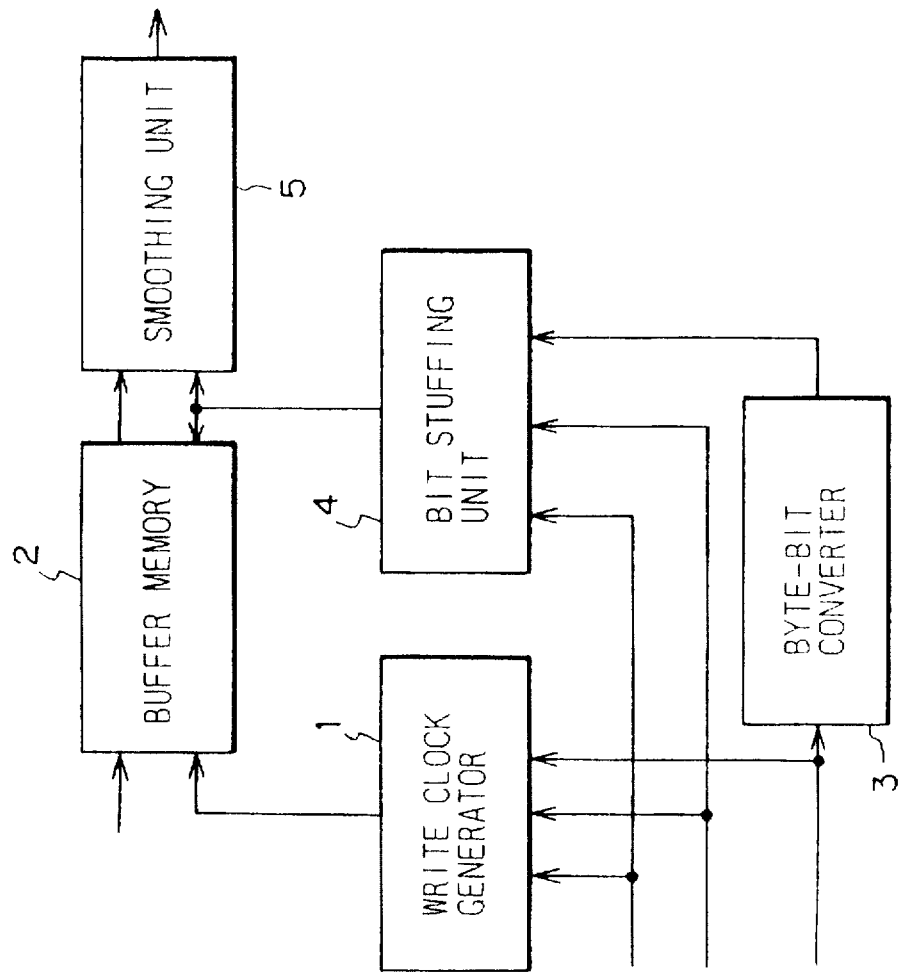
FIG. 4 is a block diagram schematically showing a jitter suppression circuit according to a prior art.

FIG. 4 is a block diagram schematically showing an example of a conventional jitter suppression circuit.

A write clock generator (a byte stuffing unit) 1 receives data and continuous clock signals from the synchronous transmission network, masks clock signals corresponding to the overhead bytes of FIG. 2A among the received clock signals, carries out positive or negative stuffing according to a byte stuffing signal contained in the received data, and generates write clock signals corresponding only to main signals contained in the received data. Namely, the write clock generator 1 produces clock signals only for an SPE (Synchronous Payload Envelope), i.e., the part outside the hatched area in FIGS. 2B and 2C.

A buffer memory 2 stores only the SPE according to the write clock signals provided by the write clock generator 1. A byte-bit converter 3 generates bit stuffing signals in response to the byte stuffing signal, to smooth the byte stuffing period. Namely, the byte-bit converter 3 generates the omitted or added clock signals due to the byte stuffing at intervals of, for example, 10 to 500 frames. A bit stuffing unit 4 masks clock signals corresponding to the overhead bytes among the continuous clock signals and carries out bit stuffing according to the bit stuffing signals, to generate read clock signals for reading the buffer memory 2.

A smoothing unit 5 reads data out of the buffer memory 2 and smoothes the omitted clock signals for the overhead bytes according to the clock signals provided by the bit stuffing unit 4, to thereby prepare the data to be transmitted to the asynchronous transmission network. The write clock generator 1, buffer memory 2, byte-bit converter 3, and bit stuffing unit 4 serve to smooth clock signals other than the omitted clock signals for the overhead bytes, as explained later in detail.

Figure 5:
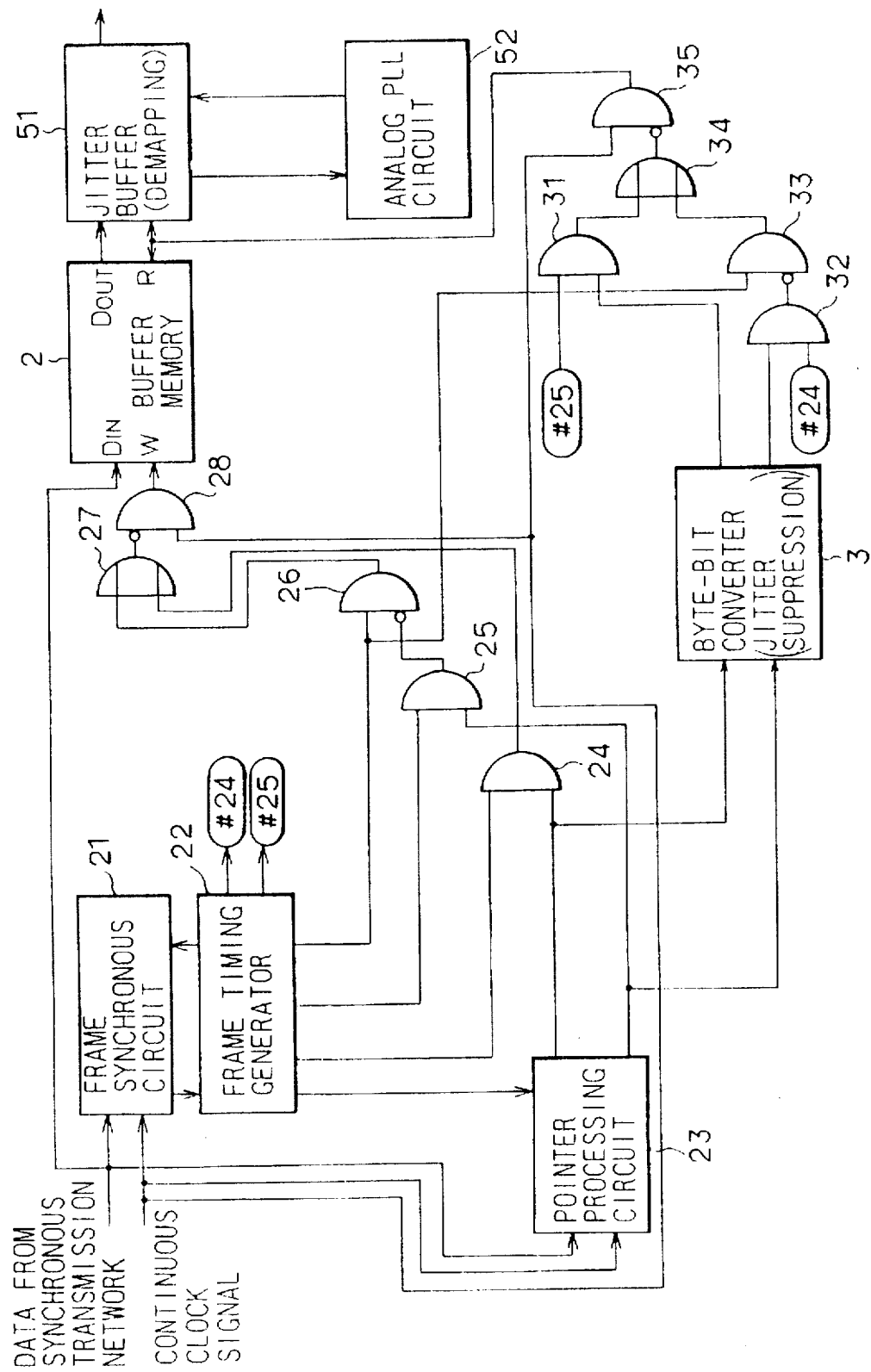
FIG. 5 is a circuit block diagram showing a concrete example of a jitter suppression circuit usable with the present invention and prior art.
Figure 6:
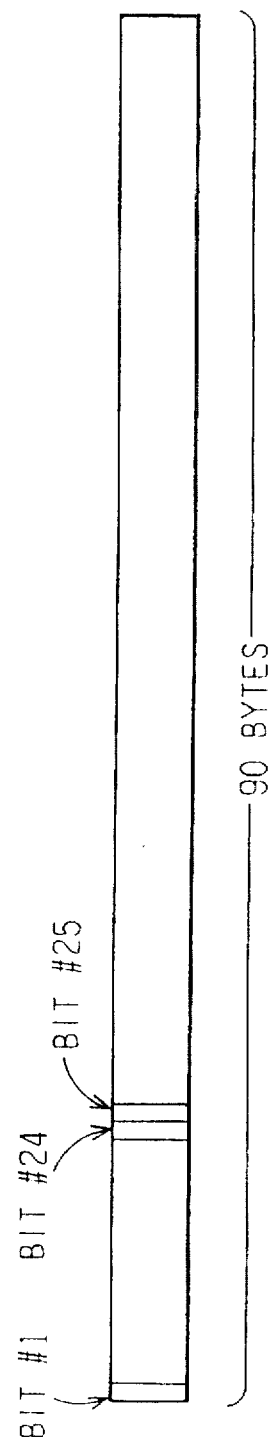
FIG. 6 is a diagram showing bit stuffing positions.

FIG. 5 shows a jitter suppression circuit usable with the present invention and with prior art. FIG. 6 shows bit stuffing positions.

The write clock generator (byte stuffing unit) 1 of FIG. 4 is made of a frame synchronous circuit (frame synchronizing circuit) 21, a frame timing generator 22, a pointer processing circuit 23, AND gates 24 to 26, an OR gate 27, and an AND gate 28, as shown in FIG. 5. The bit stuffing unit 4 is made of AND gates 31 to 33, an OR gate 34, and an AND gate 35. The smoothing unit 5 is made of a jitter buffer 51 and an analog PLL circuit 52. The frame synchronous circuit 21, frame timing generator 22, and pointer processing circuit 23 form a pointer processing unit. The jitter buffer 51 forms a demapping unit. A byte-bit converter 3 forms a jitter suppress unit.

The frame synchronous circuit 21 detects the position of a frame synchronous signal in synchronously transmitted data according to continuous clock signals and informs the frame timing generator 22 of the position. The frame timing generator 22 provides an input terminal of the AND gate 26 with a signal to mask the three overhead bytes so that no clock signals are generated for the overhead bytes. The frame timing generator 22 also provides the pointer processing circuit 23 with a signal to indicate the positions of bytes H1 and H2 used for byte stuffing.

In addition, the frame timing generator 22 provides an input terminal of the AND gate 25 with a signal to indicate the position of a byte H3 for which clock signals are inserted if negative stuffing is carried out. Further, the frame timing generator 22 provides the AND gate 24 with a signal to indicate the position of a byte next to the byte H3 for which clock signals are omitted (masked) if positive stuffing is carried out.

The pointer processing circuit 23 receives the signals to locate the bytes H1 and H2, synchronously transmitted data, and continuous clock signals and generates a positive or negative stuffing signal according to a change in pointer values in the bytes H1 and H2 (FIGS. 2A to 2C). The positive stuffing signal is sent to the AND gate 24, and the negative stuffing signal is sent to the AND gate 25. The AND gate 24 provides a signal of "1" if the positive stuffing must be carried out. This signal is sent to the AND gate 28 through the OR gate 27.

The AND gate 25 provides a signal of "1" if negative stuffing must be carried out. This signal is inverted and supplied to the AND gate 26. The AND gate 26 provides a signal to forcibly insert clock signals into the position of the byte H3 even if the overhead bytes H1 to H3 are originally set to omit clock signals. The output signal of the AND gate 26 is passed through the OR gate 27, inverted, and supplied to the AND gate 28. Consequently, the AND gate 28 provides the buffer memory 2 with clock signals that have been determined by the overhead bytes and byte stuffing signals, to let the buffer memory 2 store an SPE (Synchronous Payload Envelope).

The byte-bit converter 3 carries out smoothing as does the smoothing unit 5. The byte-bit converter 3 receives the positive or negative stuffing signal from the pointer processing circuit 23 and provides a bit stuffing signal to omit or insert a bit. To omit a bit, the byte-bit converter 3 supplies a bit omit signal to the AND gate 31. At the same time, the signal for masking the first three bytes is supplied to the AND gate 33. The outputs of the AND gates 31 and 33 are supplied to the OR gate 34. The output of the OR gate 34 is inverted and supplied to the AND gate 35. The output of the AND gate 35 causes omission of a 25th bit in a subframe specified by the bit stuffing signal processed by the byte-bit converter 3, as shown in FIG. 6.

The 25th bit is based on a signal provided by the frame timing generator 22. To insert a bit, the AND gates 32 and 33, OR gate 34, and AND gate 35 specify a 24th bit in a subframe specified by the bit stuffing signal processed by the byte-bit converter 3, as shown in FIG. 6. The 24th bit is based on a signal provided by the frame timing generator 22. The inserted bit is used as a clock signal for reading the buffer memory 2 and writing the jitter buffer 51.

When no bit stuffing is carried out, the signal for masking the first three bytes is provided as it is. The 24th bit is inserted or the 25th bit is omitted in a subframe corresponding to a bit stuffing signal generated by the byte-bit converter 3. The bits to be omitted or inserted are not necessarily the 24th and 25th bits. Any other bits may be omitted or inserted. Japanese Unexamined Patent Publication (Kokai) No. 4-196937 dated Jul. 16, 1992 discloses a byte-bit converter, i.e., a jitter suppression circuit employing no digital PLL circuit to provide bit stuffing signals.

The data stored in the buffer memory 2 according to byte stuffing information are read and smoothed by bit stuffing, to suppress jitter due to pointer actions such as omitting eight bits. The jitter suppressed data are written into the jitter buffer 51. The data in the jitter buffer 51 are smoothed by the overhead bytes, which have not been smoothed in the buffer memory 2, by the analog PLL circuit 52.

The conventional jitter suppression circuit of the Japanese Unexamined Patent Publication (Kokai) No. 4-196937 employs the byte-bit converter (bit stuffing circuit) 3 to omit or insert a bit at a transmission speed. Namely, this circuit distributes eight bits that have been omitted due to pointer actions. This causes a phase fluctuation corresponding to a transmission speed of one bit/sec., so that the analog PLL circuit 52 is insufficient to suppress jitter.

The conventional jitter suppression circuit employs a clock generator made of CMOS circuits for generating clock signals at 25 MHz, to distribute the omitted eight bits. Each of the scattered bits may be divided by N, for example, 6 to further suppress jitter. In this case, a high-frequency clock signal of, for example, 25 MHz×6=150 MHz is required. It is difficult, however, to prepare a 150-MHz clock generator with CMOS circuits. If other elements are employed, the cost of the clock generator will be high.

Now, a jitter suppression circuit according to an embodiment of the present invention will be explained.

Figure 7:
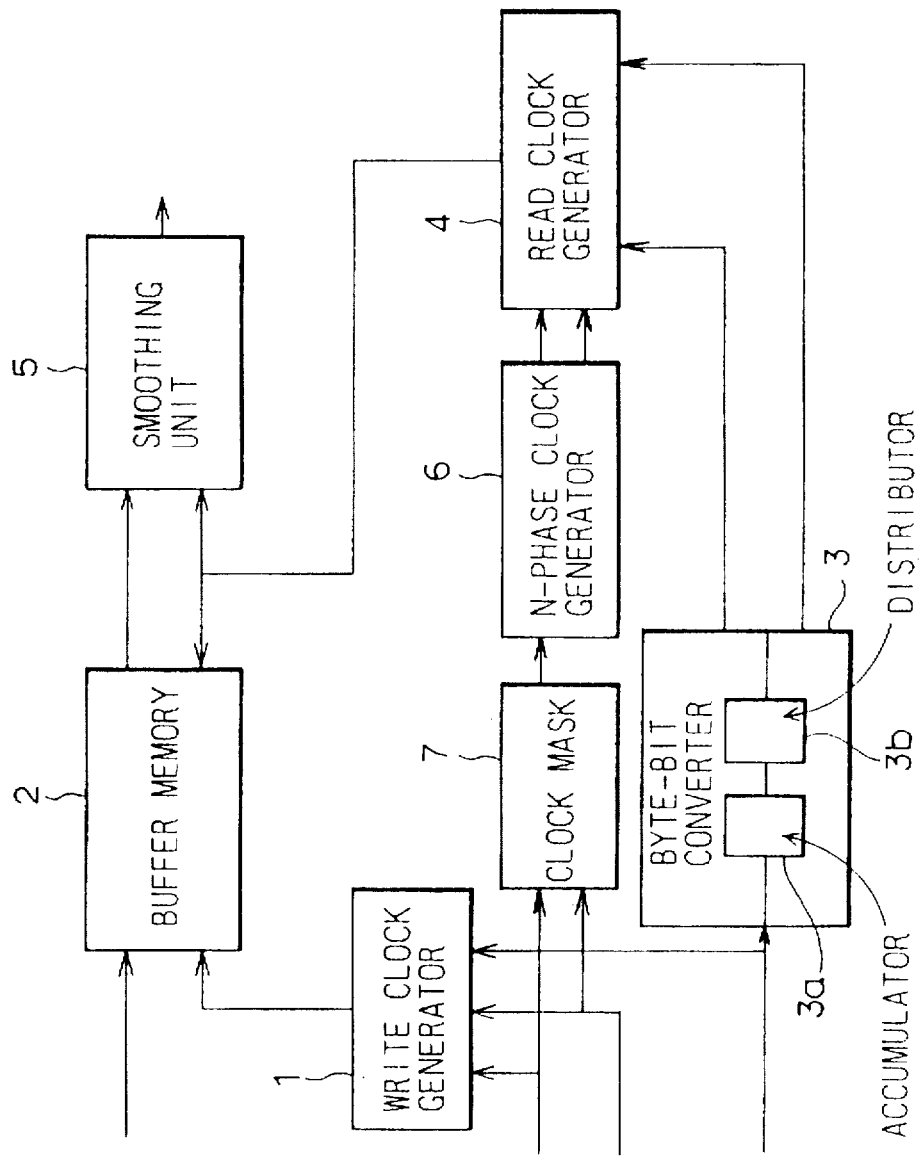
FIG. 7 is a block diagram schematically showing the principle of a jitter suppression circuit according to the present invention.

FIG. 7 is a block diagram schematically showing the principle of the jitter suppression circuit according to the present invention.

The jitter suppression circuit suppresses jitter of clock signals in a synchronous transmission network. Components of the jitter suppression circuit will be explained. A write clock generator 1 receives data and clock signals, masks clock signals corresponding to overhead signals among the received clock signals, carries out positive or negative stuffing according to a byte stuffing signal contained in the data signals, and generates clock signals corresponding only to main signals contained in the received data signals.

A buffer memory 2 stores data related to the main signals according to the clock signals provided by the write clock generator 1. A byte-bit converter 3 has an accumulator 3a and a distributor 3b. The accumulator 3a accumulates bits related to the positive or negative stuffing according to the byte stuffing signal. The distributor 3b distributes the accumulated bits according to a moving average for a predetermined period, to generate smoothed bit stuffing signals. A clock mask 7 masks clock signals corresponding to overhead bytes among the received clock signals.

An N-phase clock generator 6 divides the period of the output clock signal of the clock mask 7 by N, to generate N-phase clock signals. A read clock generator 4 sequentially selects the N-phase clock signals according to the bit stuffing signals, to generate clock signals for reading the buffer memory 2. A smoothing unit 5 reads the data stored in the buffer memory 2 according to the clock signals provided by the read clock generator 4 while smoothing the masked clock signals corresponding to the overhead bytes, and saves the smoothed read data for an asynchronous transmission network. This jitter suppression circuit reduces phase fluctuations due to bit stuffing and suppresses jitter.

The present invention also provides an N-phase clock generator. Components of the N-phase clock generator will be explained. A phase delay unit 6a has gates for delaying the phase of an input clock signal. A frequency divider 6b halves the frequency of the output of each of predetermined ones of the gates of the phase delay unit 6a. A phase detector 6c detects any of the gates that provides a clock signal that is delayed behind the input clock signal by one period of the input clock signal or more. A select signal generator 6d converts only a first detected output from the phase detector 6c into a select signal. An N-phase clock selector 6e selects, according to the select signal, those of the gates that divide the period of the input clock signal into N phases, to thereby generate N-phase clock signals.

This N-phase clock generator employs the delay gates to provide the effect of generating high-frequency clock signals according to an ordinary clock signal.

The jitter suppression circuit of FIG. 7 according to the present invention will be explained in detail.

The jitter suppression circuit has the write clock generator 1, buffer memory 2, byte-bit converter 3 having the accumulator 3a and distributor 3b, read clock generator 4, smoothing unit 5, N-phase clock generator 6, and clock mask 7. Compared with the prior art of FIG. 4, the present invention of FIG. 7 additionally has the N-phase clock generator 6 and read clock generator 4.

The write clock generator 1 carries out positive or negative stuffing according to a positive or negative byte stuffing signal contained in data received from a synchronous transmission network such as SONET, and generates clock signals corresponding only to main data (all parts of FIGS. 2B and 2C except the hatched parts) in the received data. The write clock generator 1 masks clock signals corresponding to overhead signals (first three bytes in each subframe of FIG. 2A) among continuous clock signals received from the synchronous transmission network. The buffer memory 2 stores only an SPE from the received data according to the clock signals provided by the write clock generator 1.

The byte-bit converter 3 has the accumulator 3a and distributor 3b, to generate smoothed bit stuffing signals according to a moving average for a predetermined period. The accumulator 3a accumulates bits related to the positive or negative stuffing according to the byte stuffing signals. The distributor 3b distributes the accumulated bits. The clock mask 7 masks clock signals corresponding to the overhead bytes among the received clock signals. The N-phase clock generator 6 divides the period of the output clock signal of the clock mask 7 by N, to generate N-phase clock signals.

The read clock generator 4 sequentially selects clock signals among the N-phase clock signals according to the bit stuffing signals, to generate clock signals for reading the buffer memory 2. The smoothing unit 5 reads the data stored in the buffer memory 2 according to the clock signals provided by the read clock generator 4 while smoothing the masked clock signals corresponding to the overhead bytes, and saves the smoothed read data for the asynchronous transmission network.

In this way, the jitter suppression circuit according to the present invention masks clock signals corresponding to overhead bytes among received clock signals and equally divides the period of the clock signals by N, to generate N-phase clock signals. The present invention sequentially selects the N-phase clock signals according to bit stuffing signals. Unlike the prior art of FIG. 4 that carries out one-bit stuffing (one-bit omission or insertion), the present invention carries out 1/N-phase stuffing, for example, ⅙-bit stuffing.

Figure 8:
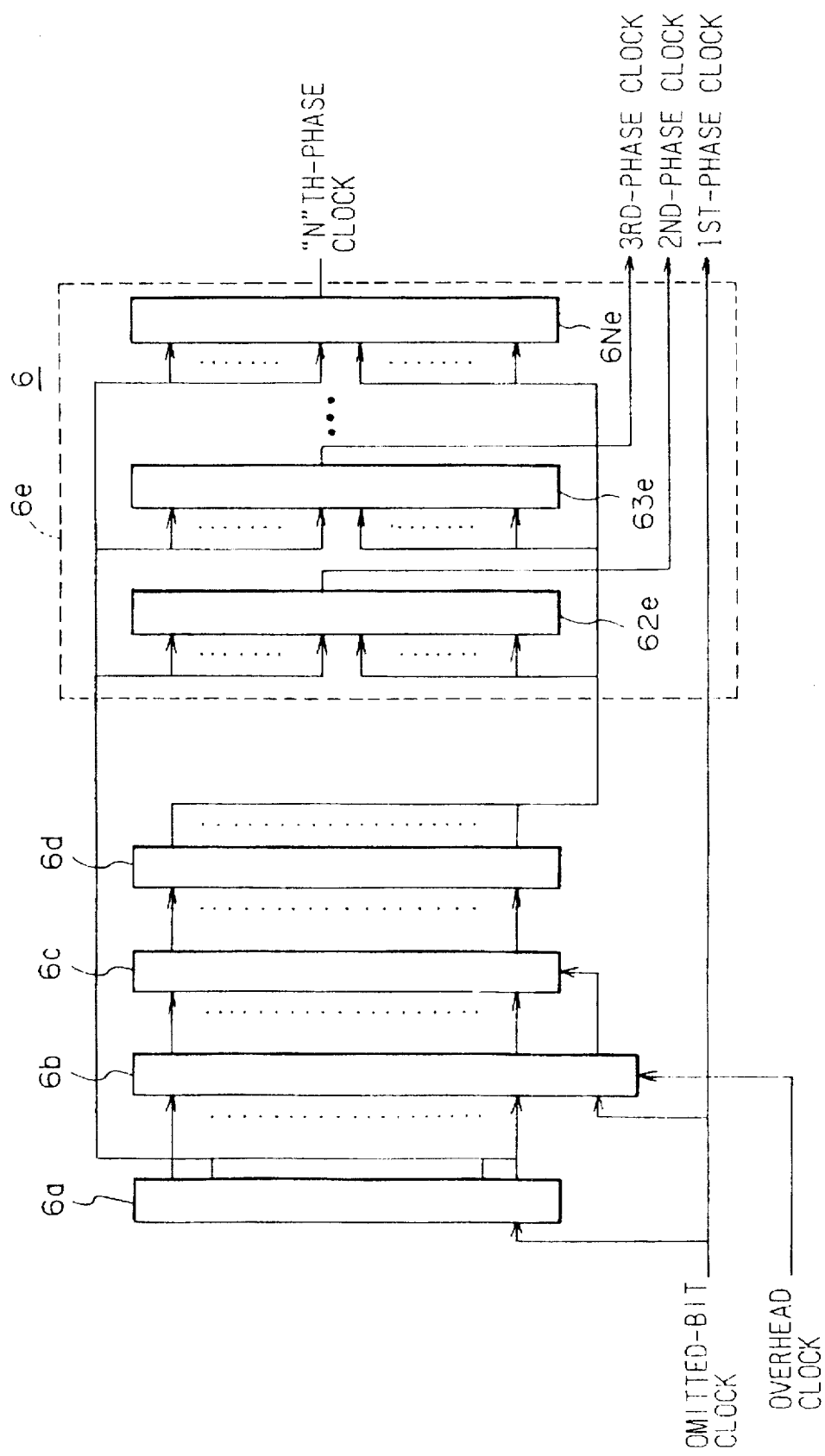
FIG. 8 is a block diagram showing the principle of a first example of an N-phase clock generator according to the present invention.

FIG. 8 is a block diagram showing the principle of a first example of an N-phase clock generator 6 according to the present invention. The N-phase clock generator 6 has a phase delay unit 6a, a frequency divider 6b, a phase detector 6c, a select signal generator 6d, and a gate selector 6e.

The phase delay unit 6a has multiple gates for delaying a received clock signal. The frequency divider 6b has D-type flip-flops to halve the frequency of the output of each of the gates of the phase delay unit 6a.

The phase detector 6c detects any of the gates that provides a clock signal that is delayed behind the input clock signal by one period of the input clock signal or more. The select signal generator 6d converts only a first detected output from the phase detector 6c into a select signal. The gate selector 6e selects, according to the select signal, those of the gates that divide the period of the input clock signal into N phases. The gate selector 6e has gate selection units 62e to 6Ne for selecting 2nd- to Nth-phase clock signals. The 1st-phase clock signal is directly prepared according to a received clock signal CLK000. In the following explanation, blocks having the same reference marks substantially have the same arrangement, and therefore, they will not be explained again.

In FIG. 8, the N-phase clock generator 6 delays an input clock signal through gates, halves the frequency of each delayed clock signal, and provides flip-flops with the frequency-halved clock signals. When the delay is less than the period of the input clock signal, the flop-flops each provide an output Q at a low level 0, and when the delay exceeds the period of the clock signal, at a high level 1. The output of the flip-flop in which the delay first exceeds the period of the clock signal is provided as a select signal. The select signal is used to specify those of the gates that equally divide the period of the clock signal by N. Even if the delay by the phase delay unit 6a fluctuates due to device temperature changes and power source voltage fluctuations, the jitter suppression circuit of the present invention generates the N-phase clock signals having correct phase differences.

Figure 9:
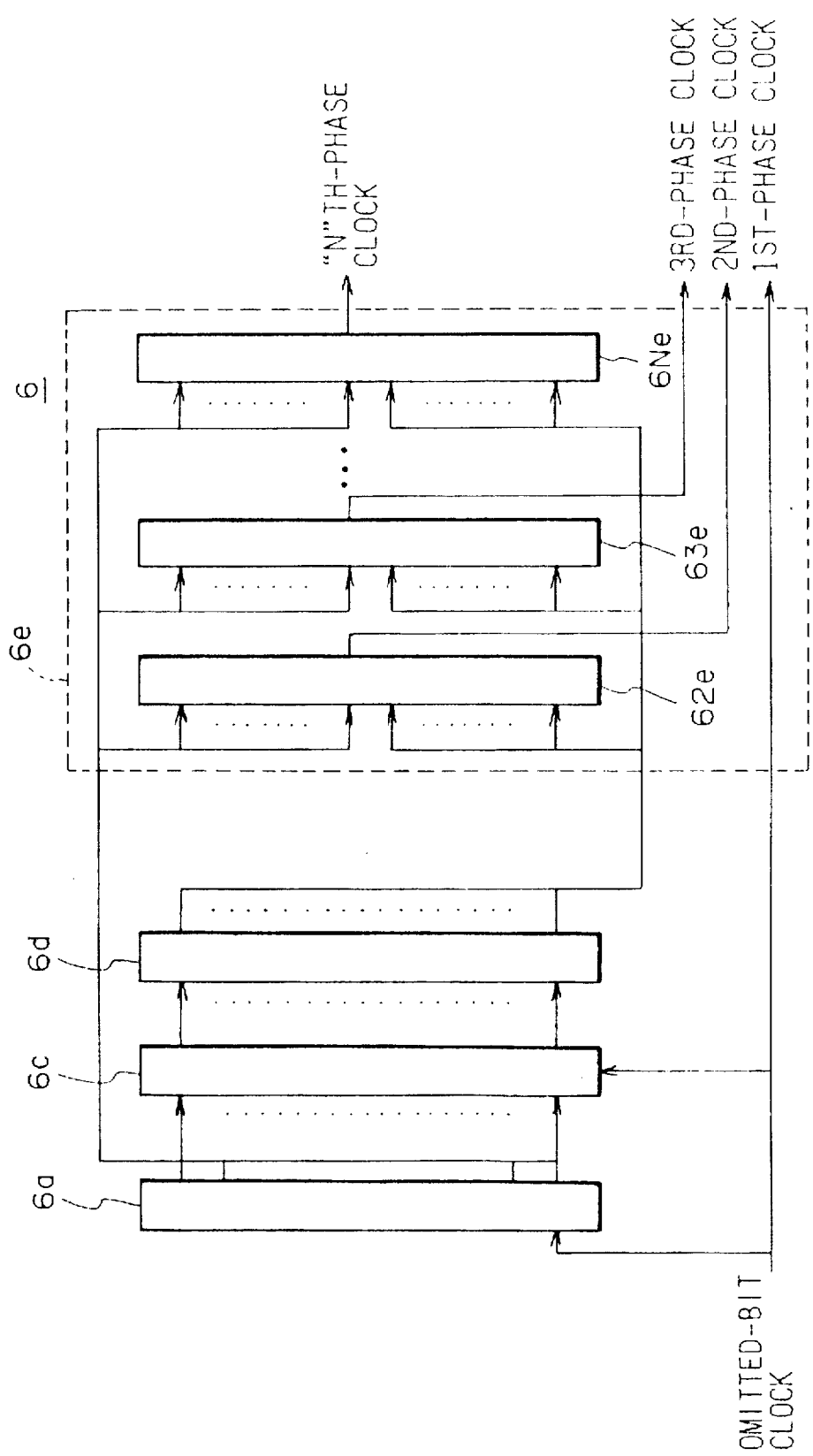
FIG. 9 is a block diagram showing the principle of a second example of an N-phase clock generator according to the present invention.

FIG. 9 is a block diagram showing the principle of a second example of an N-phase clock generator according to the present invention.

The N-phase clock generator 6 has a phase delay unit 6a, a phase detector 6c, a select signal generator 6d, and a gate selector 6e. The phase delay unit 6a has gates for delaying the phase of an input clock signal. The outputs of predetermined ones of the gates of the phase delay unit 6a are supplied to D-inputs of D-type flip-flops.

The phase detector 6c detects any of the gates that provide a clock signal that is delayed behind the input clock signal by half the period of the input clock signal or more. The select signal generator 6d converts only the first detected output from the phase detector 6c into a select signal. The gate selector 6e selects, according to the select signal, those of the gates that divide half of the period of the input clock signal by N/2 or that are equal to the products of half of the period and N/2.

The N-phase clock generator 6 of FIG. 9 delays an input clock signal through gates and provides flip-flops with the delayed clock signals. Each of the flip-flops provides a low-level output L if the delay is less than the period of the clock signal, and if the delay exceeds half the period, a high-level output H. The output of the flip-flop corresponding to a gate at which the delay of the clock signal first exceeds half the period of the clock signal serves as a select signal. The select signal is used to select those of the gates that divide half the period of the input clock signal by N.

Figure 10:
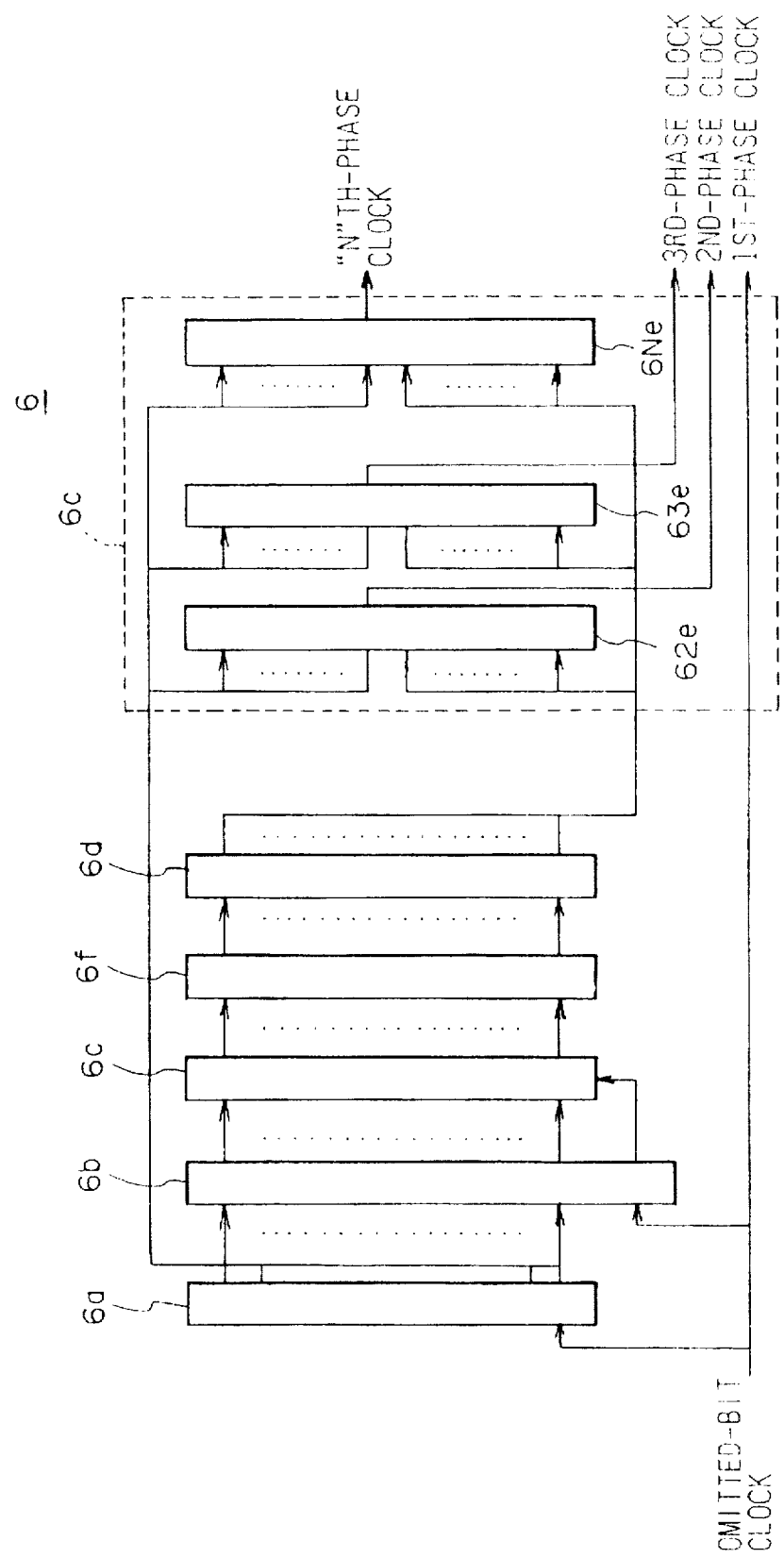
FIG. 10 is a block diagram showing the principle of a third example of an N-phase clock generator according to the present invention.

FIG. 10 is a block diagram showing the principle of a third example of an N-phase clock generator according to the present invention. The N-phase clock generator of FIG. 10 has a phase determination unit 6f between the phase detector 6c and the select signal generator 6d of the N-phase clock generator of FIG. 8.

The phase determination unit 6f inhibits the phase detector 6c from providing detected outputs following a first detected output. The phase detector 6c may provide a plurality of detected outputs due to fluctuations in the setup hold time of the flip-flops of the phase detector 6c. To prevent malfunctions due to the plurality of detected outputs, the phase determination unit 6f inhibits the detected outputs after the first.

Figure 11:
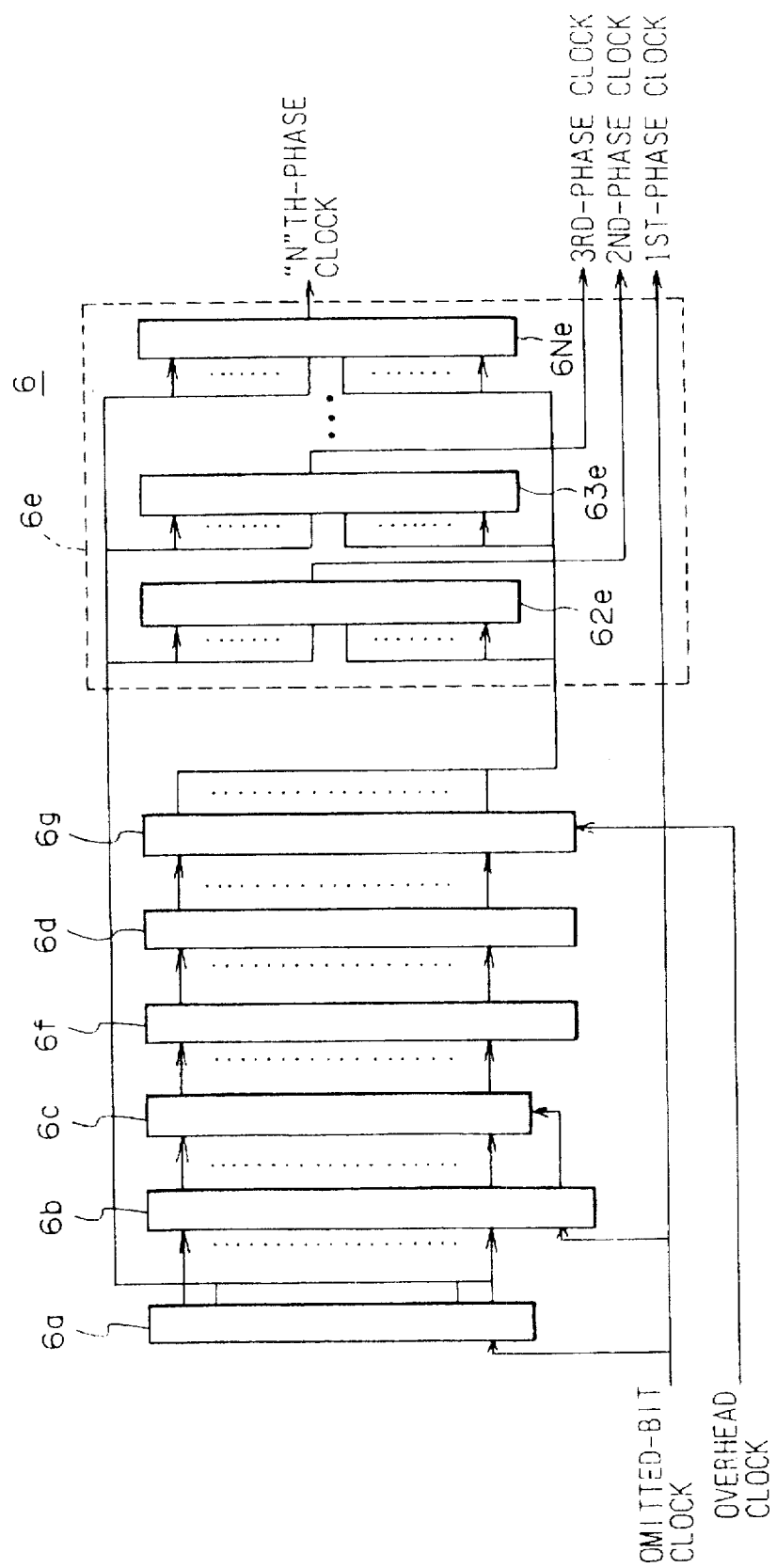
FIG. 11 is a block diagram showing the principle of a fourth example of an N-phase clock generator according to the present invention.

FIG. 11 is a block diagram showing the principle of a fourth example of an N-phase clock generator according to the present invention. The N-phase clock generator of FIG. 11 has a selection signal processor 6g between the selection signal generator 6d and the gate selector 6e.

The select signal processor 6g has flip-flops that adjust the select signal of the select signal generator 6d according to the overhead bytes, to easily switch the N-phase clock signals from one to another.

Figure 12:
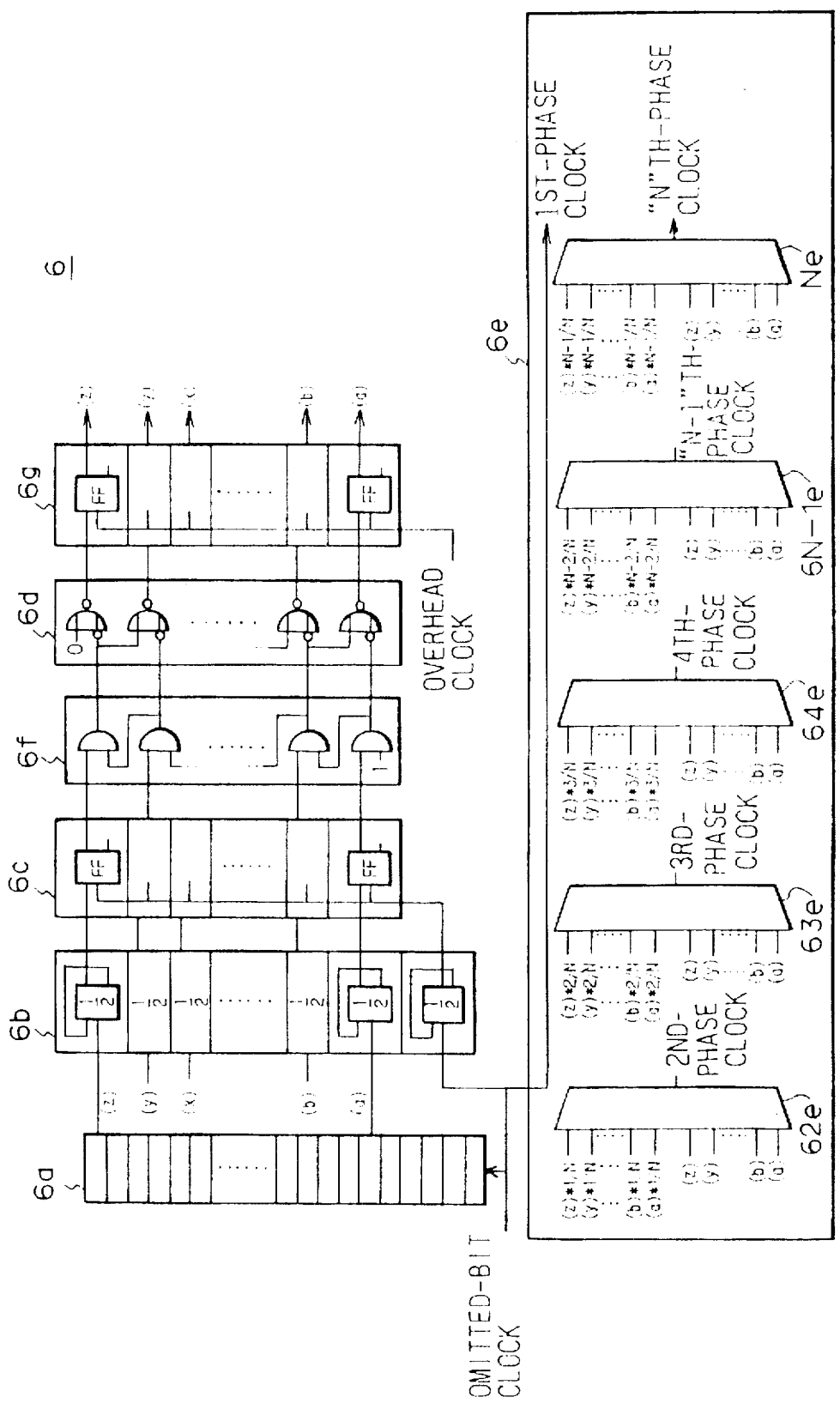
FIG. 12 is a block diagram showing a concrete example of an N-phase clock generator in a jitter suppression circuit according to the present invention.
Figure 13:
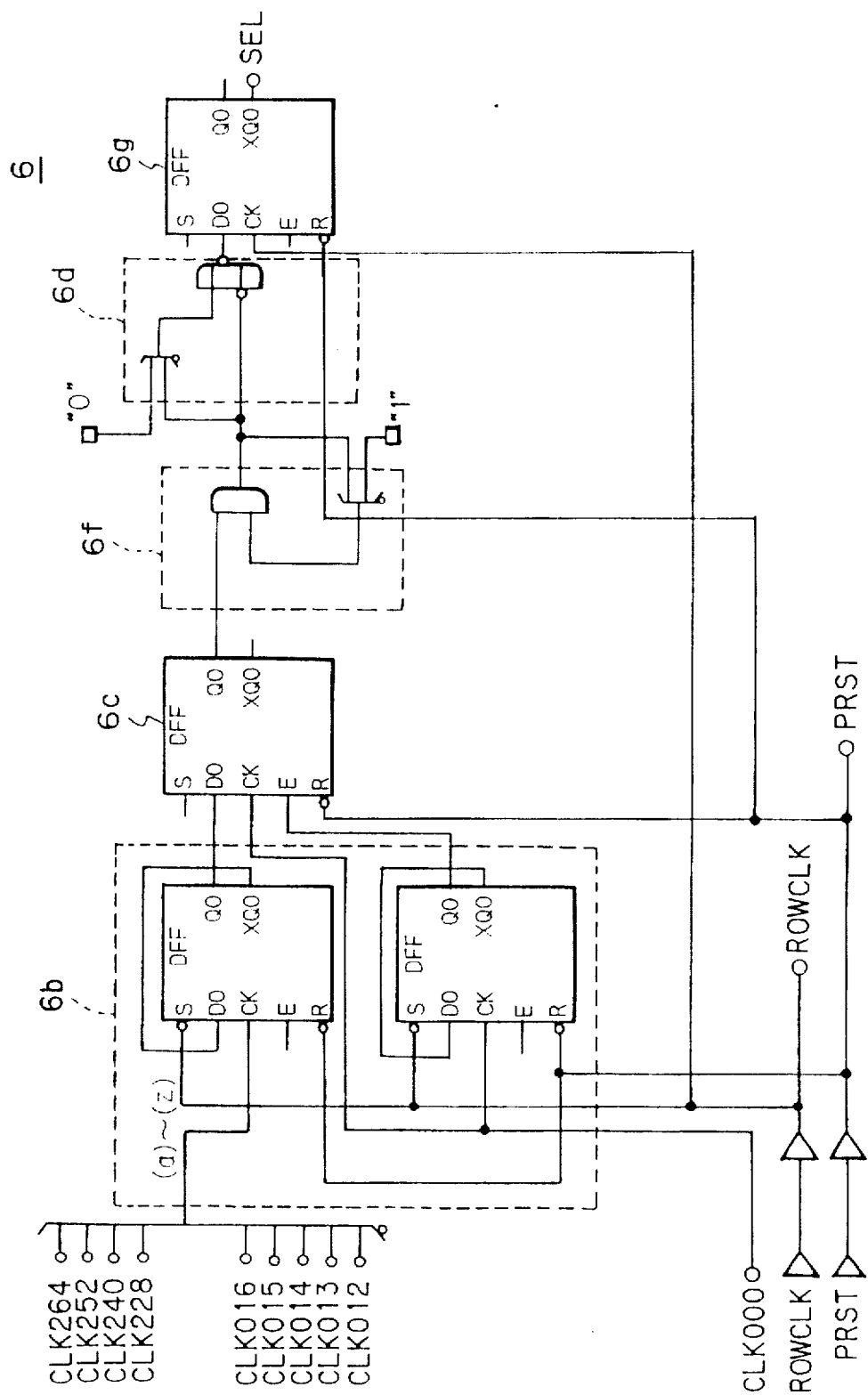
FIG. 13 is a circuit diagram showing the essential part of the N-phase clock generator of FIG. 12.

FIG. 12 is a block diagram showing an N-phase clock generator for a jitter suppression circuit according to an embodiment of the present invention. FIG. 13 shows an essential part of the N-phase clock generator of FIG. 12. The N-phase clock generator of FIGS. 12 and 13 is based on the fourth example of FIG. 11.

The N-phase clock generator in FIG. 12 has a phase delay unit 6a, a frequency divider 6b, a phase detector 6c, a phase determination unit 6f, a select signal generator 6d, a select signal processor 6g, and a gate selector 6e.

Figure 16:
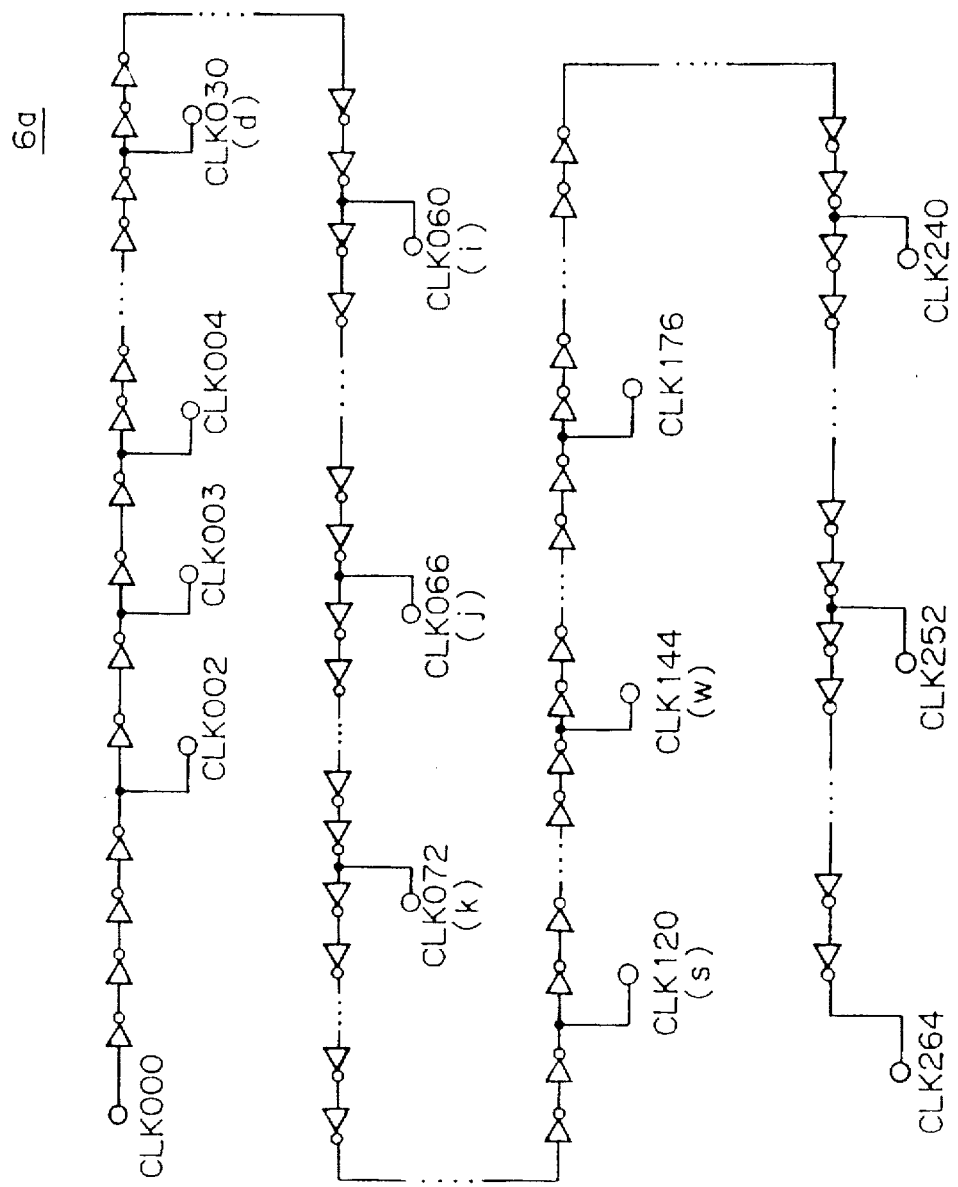
FIG. 16 is a circuit diagram showing a concrete example of a phase delay unit in the N-phase clock generator of FIG. 12.
Figure 17:
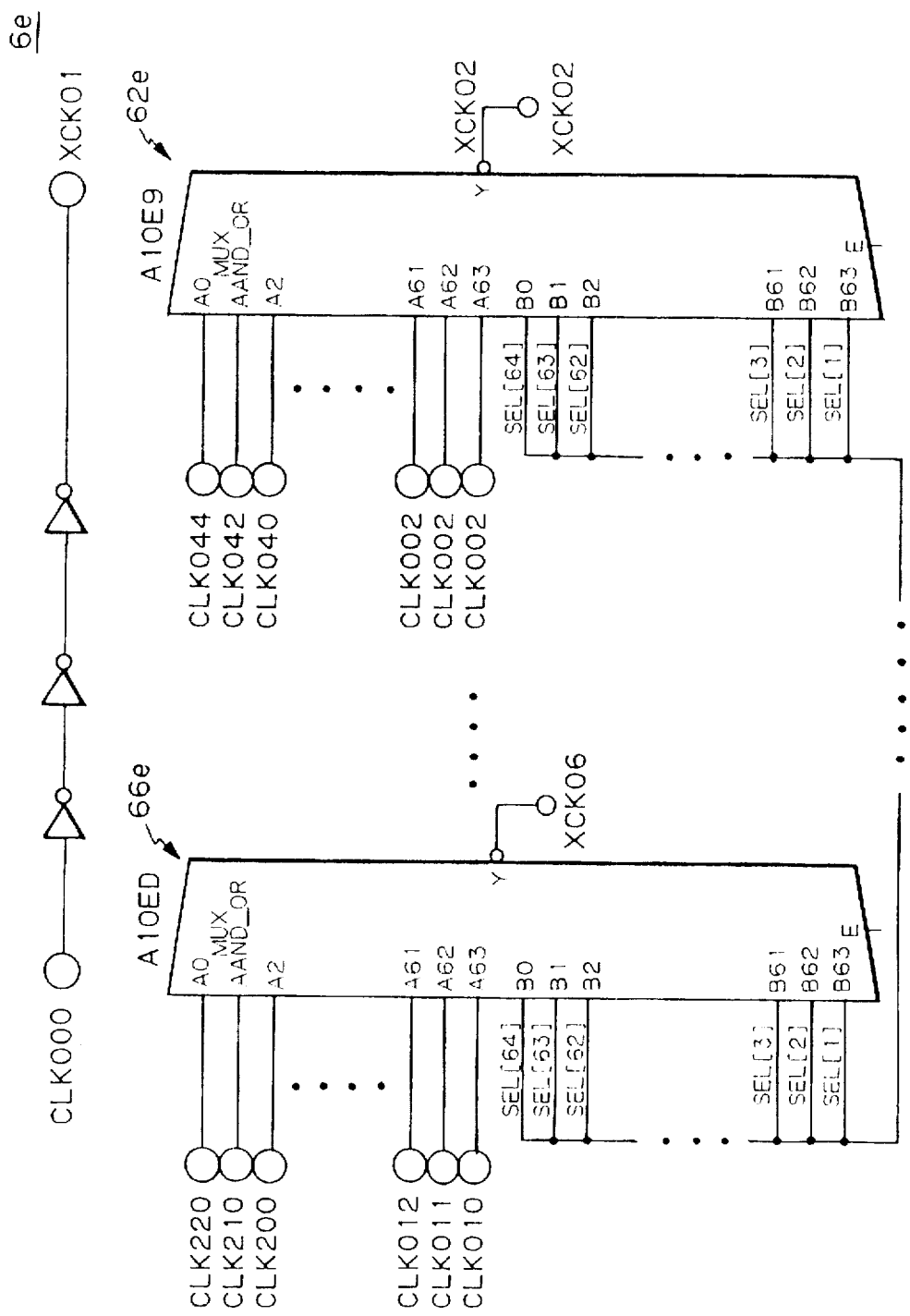
FIG. 17 is a circuit diagram showing a concrete example of a gate selector in the N-phase clock generator of FIG. 12.

FIG. 14 shows examples of logic between the phase detector 6c and the select signal processor 6g. FIG. 15 is a timechart for explaining the phase detector 6c. FIG. 16 is a circuit diagram showing a concrete example of the phase delay unit 6a. FIG. 17 is a circuit diagram showing a concrete example of the gate selector 6e. The phase delay unit 6a and gate selector 6e of which embodiment generate six-phase clock signals.

In FIGS. 12 and 16, the phase delay unit 6a has a plurality (for example, several hundreds) of inverters serving as gates connected in series. Predetermined inverters provide clock signals CLK002 to CLK264. Namely, an input clock signal CLK000 is phase-delayed by the series-connected inverters. The inverters from which the clock signals are taken out are selected according to delay requirements.

In FIG. 12 and 13, the frequency divider 6b has a plurality of D-type flip-flops each of which halves the frequency of the delayed clock signal provided by the corresponding inverter. Although the frequency divider 6b of FIG. 13 shows only two flip-flops for the sake of simplicity, it actually has a flip-flop for receiving the clock signal CLK-OOO and flip-flops for receiving clock signals (a) to (z), respectively. These flip-flops halve the frequencies of the clock signals (a) to (z), respectively. The phase detector 6c has flip-flops, the phase determination unit 6f has AND gates, the select signal generator 6d has NOR gates, and the selection signal processor 6g has flip-flops, corresponding to the clock signals (a) to (z), respectively.

The phase detector 6c detects any of the gates that provides a clock signal (one of CLK002 to CLK264) that is delayed behind the input clock signal by one period of the input clock signal or more. As shown in FIG. 15, the phase detector 6c receives the clock signals (a) to (z) (omitted clock signals) that have been delayed by the phase delay unit 6a and halved by the frequency divider 6b. One of the clock signals (a) to (z) whose delay is equal to the period of the input clock signal is detected, and the gate corresponding to the detected signal is found.

The phase determination unit 6f has AND gates each of which has an input fixed to a high level H. The unit 6f is disposed on the output side of the phase detector 6c, to prevent providing a plurality of detected outputs. Even if there are fluctuations in the setup hold time of the flip-flops of the phase detector 6c, to produce a plurality of detection outputs, the phase determination unit 6f provides only the first one of the detected outputs, to prevent malfunctions.

In FIG. 14, the phase detector 6c provides high-level outputs H of 1 for the clock signals (a) to (i), and a first low-level output L of 0 for the clock signal (j). Accordingly, the phase determination unit 6f provides outputs of 1 for the clock signals (a) to (i) and outputs of 0 for the clock signals (j) to (z). Namely, the phase determination unit 6f provides outputs of 0 for the clock signals following the clock signal (j) that has been firstly provided with 0. The phases of the clock signals (t) to (z) from the phase detector 6c are delayed by more than three periods. As shown in FIG. 14, the select signal generator 6d provides 1 only for the last "1" output of the phase determination unit 6f and zeroes the outputs preceding the clock signal (i). The outputs of the select signal processor 6g change at the overhead byte position, i.e., the clock signal (i). In FIG. 14, a reference mark X indicates an indefinite state.

The select signal generator 6d has NOR gates each having an input fixed to a low level L of 0, to convert only a first one of the output signals of the phase determination unit 6f indicating that the delay starts to exceed the period of the clock signal. The select signal processor 6g has D-type flip-flops corresponding to the clock signals (a) to (z), respectively, to adjust the output of the select signal generator 6d according to the overhead bytes. The select signal processor 6g selects the N-phase clock signals in accordance with the overhead byte position.

As shown in FIGS. 12 and 17, the gate selector 6e has a plurality of gate select units 62e to 6Ne to select, according to the output of the select signal processor 6g, those of the gates that divide the period of the input clock signal into N phases. As explained above, the gate selector 6e of FIG. 17 provides six-phase clock signals. Accordingly, the gate select units 62e to 66e of the gate selector 6e select the 2nd- to 6th-phase clock signals XCK02 to XCK06, respectively. If the gate select unit 62e for selecting the 2nd-phase clock signal XCK02 receives a select signal SEL|64| for a select signal terminal B0, the clock signal CLK044 supplied to a clock input terminal A0 is selected and is provided as the 2nd-phase clock signal XCK02. If a select signal SEL|3| to a select signal terminal B61 is received, the clock signal CLK002 to a clock input terminal A61 is selected and provided as the 2nd-phase clock signal XCK02. The 1st-phase clock signal XCK01 is directly prepared according to the input clock signal CLK000 through the third inverter.

Table 1 shows gate selections of the gate select units 62e to 66e of the gate selector 6e with N=6 (six phases).

TABLE 1

| Detected gate number | Gate select unit 66e (6th phase) | Gate select unit 66e (5th phase) | Gate select unit 66e (4th phase) | Gate select unit 66e (3th phase) | Gate select unit 66e (2th phase) | (1st) phase) |
|---|---|---|---|---|---|---|
| 12(a) | 10 | 8 | 6 | 4 | 2 | 0 |
| 18(b) | 15 | 12 | 9 | 6 | 3 | 0 |
| 24(c) | 20 | 16 | 12 | 8 | 4 | 0 |
| 30(d) | 25 | 20 | 15 | 10 | 5 | 0 |
| 36(e) | 30 | 24 | 18 | 12 | 6 | 0 |
| 42(f) | 35 | 28 | 21 | 14 | 7 | 0 |
| 48(g) | 40 | 32 | 24 | 16 | 8 | 0 |
| 54(h) | 45 | 36 | 27 | 18 | 9 | 0 |
| 60(i) | 50 | 40 | 30 | 20 | 10 | 0 |
| 66(j) | 55 | 44 | 33 | 22 | 11 | 0 |
| 72(k) | 60 | 48 | 36 | 24 | 12 | 0 |
| 78(l) | 65 | 52 | 39 | 26 | 13 | 0 |
| 84(m) | 70 | 56 | 42 | 28 | 14 | 0 |
| 90(n) | 75 | 60 | 45 | 30 | 15 | 0 |
| 96(o) | 80 | 64 | 48 | 32 | 16 | 0 |
| 102(p) | 85 | 68 | 51 | 34 | 17 | 0 |
| 108(q) | 90 | 72 | 54 | 36 | 18 | 0 |
| 114(r) | 95 | 76 | 57 | 38 | 19 | 0 |
| 120(s) | 100 | 80 | 60 | 40 | 20 | 0 |
| 126(t) | 105 | 84 | 63 | 42 | 21 | 0 |
| 132(u) | 110 | 88 | 66 | 44 | 22 | 0 |
| 138(v) | 115 | 92 | 69 | 46 | 23 | 0 |
| 144(w) | 120 | 96 | 72 | 48 | 24 | 0 |
| 150(x) | 125 | 100 | 75 | 50 | 25 | 0 |
| 156(y) | 130 | 104 | 78 | 52 | 26 | 0 |
| 162(z) | 135 | 108 | 81 | 54 | 27 | 0 |

For example, if the 66th gate is detected as a gate where the delay of the corresponding clock signal (j) starts to exceed the period of the input clock signal, the gate select unit 66e selects the 55th gate, the gate select unit 65e selects the 44th gate, the gate select unit 64e selects the 33rd gate, the gate select unit 63e selects the 22nd gate, and the gate select unit 63e selects the 11th gate.

If the 72nd gate is detected as a gate where the delay of the corresponding clock signal (k) starts to exceed the period of the input clock signal, the gate select unit 66e selects the 60th gate, the gate select unit 65e selects the 48th gate, the gate select unit 64e selects the 36th gate, the gate select unit 63e selects the 24th gate, and the gate select unit 63e selects the 12th gate. The 1st-phase clock signal is not delayed by any gate but is provided as it is. Although the detected gates in Table 1 are multiples of 6, they may not be limited to the multiples of 6 even if N=6. If the phase detector 6c detects, as the gate where the delay of the corresponding clock signal starts to exceed the period of the input clock signal, a gate whose position is not a multiple of 6, the gate nearest to the detected gate is selected in Table 1.

In FIG. 13, a clock signal ROWCLK represents an omitted position, and a reset signal PRST is generated when a power source is turned ON. These signals ROWCLK and PRST set or reset the flip-flops in the frequency divider 6b, phase detector 6c, and select signal processor 6g, to control operations at the omitted position and at the time of power ON.

In the above explanation, the N-phase clock generator 6 is used for a jitter suppression circuit in a synchronous transmission network. The N-phase clock generator 6 may be used with another circuit or system. The N-phase clock generator of the present invention is capable of converting an input clock signal into N-phase clock signals whose frequency is higher than that of the input signal. For example, a six-phase clock generator according to the present invention is capable of providing the effect of generating a clock signal of 150 MHz (25 MHz×6) using an input clock signal of 25 MHz. The clock signal of 150 MHz is resistive to device temperature changes and power source voltage fluctuations.

FIG. 18 is a block diagram showing the principle of a first example of a read clock generator for a jitter suppression circuit according to the present invention.

The read clock generator 4 has a ring counter 4a and a read selector 4b. The ring counter 4a is of N stages operating in response to a bit stuffing signal. The ring counter 4a is shifted to the right in response to a positive stuffing signal I and to the left in response to a negative stuffing signal D, to provide N selection signals from a 1st-phase select signal to an Nth-phase select signal. The read selector 4b receives the N select signals from the ring counter 4a and sequentially selects N clock signals from a first-phase clock signal to an Nth-phase clock signal as read clock signals. The N clock signals are provided by the N-phase clock generator 6 as mentioned above.

Figures 19A, 19B, 19C:
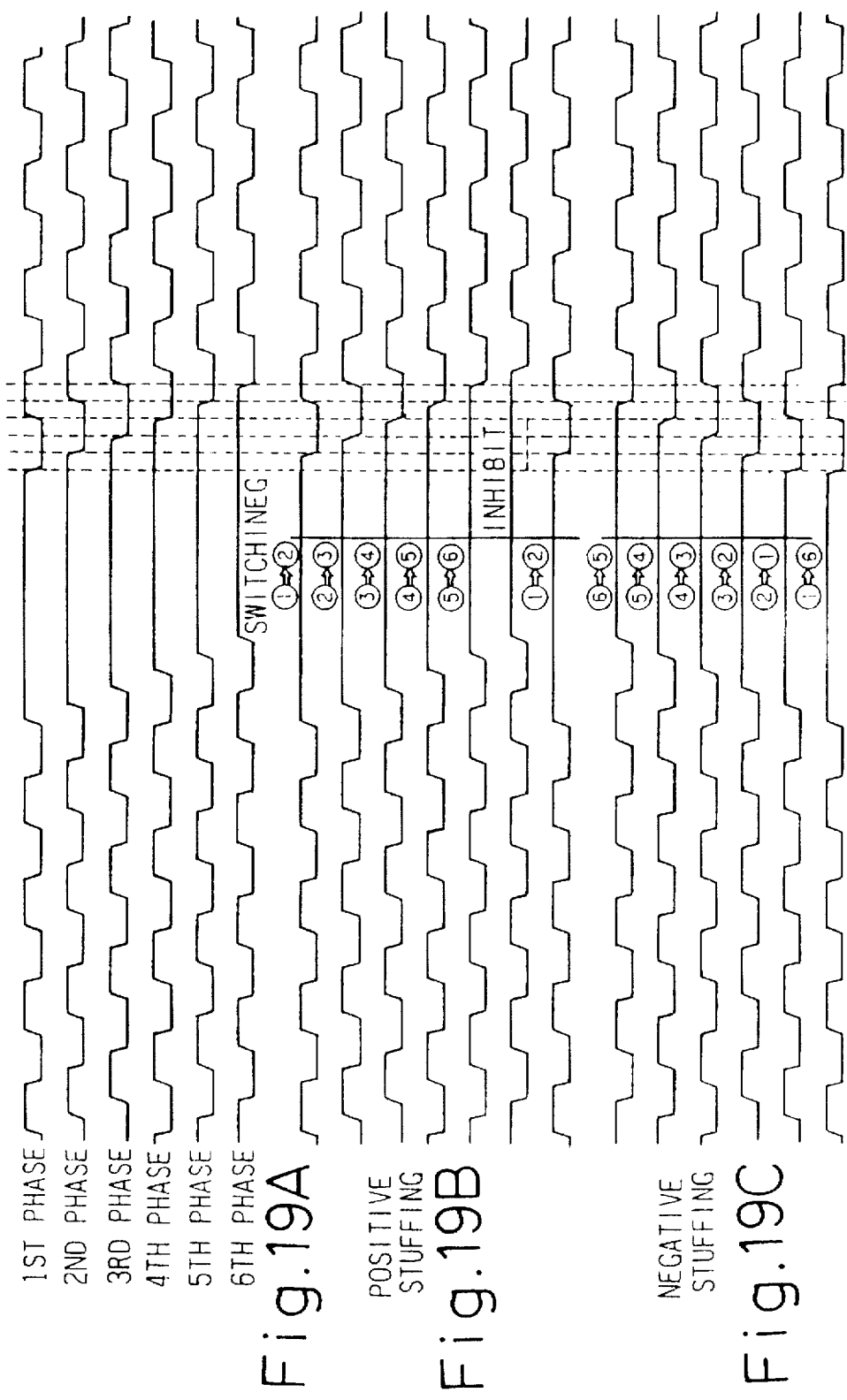
FIG. 19 is a timechart for explaining a read clock generator in a jitter suppression circuit according to the present invention.

FIG. 19 is a timechart for explaining the operation of the read clock generator with N=6.

When the read clock generator 4 of FIG. 18 receives a positive stuffing signal, the ring counter 4a sequentially generates Nth- to 1st-phase select signals (circulating from the Nth to the 1st) in response to stuffing signals, so that the N-phase clock signals are sequentially selected from the 1st- to Nth-phase clock signals (circulating from the Nth to the 1st). As a result, the phase is delayed by 1/N whenever the clock signals are switched from one to another, to cause a shift of 1/N phases.

In the positive stuffing of FIG. 19, the 1st-phase clock signal is switched to the 2nd-phase clock signal that is behind the 1st-phase clock signal by ⅙ of a phase, and the 2nd-phase clock signal is switched to the 3rd-phase clock signal that is behind the 2nd-phase clock signal by ⅙ of a phase. Similarly, the 5th-phase clock signal is switched to the 6th-phase clock signal that is behind the 5th-phase clock signal by ⅙ of a phase, and the 6th-phase clock signal is switched to the 1st-phase clock signal of the next period which is behind the 6th-phase clock signal by ⅙ of a phase. In this way, the phase is delayed and shifted by ⅙ of a phase whenever the clock signals are switched from one to another.

When the read clock generator 4 of FIG. 18 receives negative stuffing signals, the ring counter 4a generates Nth- to 1st-phase clock signals (circulating from the Nth to the 1st) in response to the stuffing signals, so that the N-phase clock signals are sequentially selected from the Nth to the 1st (circulating from the 1st to the Nth). As a result, the phase is advanced by 1/N whenever the clock signals are switched from one to another, to cause a shift of 1/N phases.

In the negative stuffing of FIG. 19, the 6th-phase clock signal is switched to the 5th-phase clock signal that is ahead the 6th-phase clock signal by ⅙ of a phase, and the 5th-phase clock signal is switched to the fourth-phase clock signal that is ahead the 5th-phase clock signal by ⅙ of a phase.

Similarly, the 2nd-phase clock signal is switched to the 1st-phase clock signal that is ahead the 2nd-phase clock signal by ⅙ of a phase, and the 1st-phase clock signal is switched to the 6th-phase clock signal of the preceding period that is ahead the 1st-phase clock signal by ⅙ of a phase. In this way, whenever the clock signals are switched from one to another, the phase is advanced by ⅙, to cause a shift of ⅙ of a phases.

Figure 20:
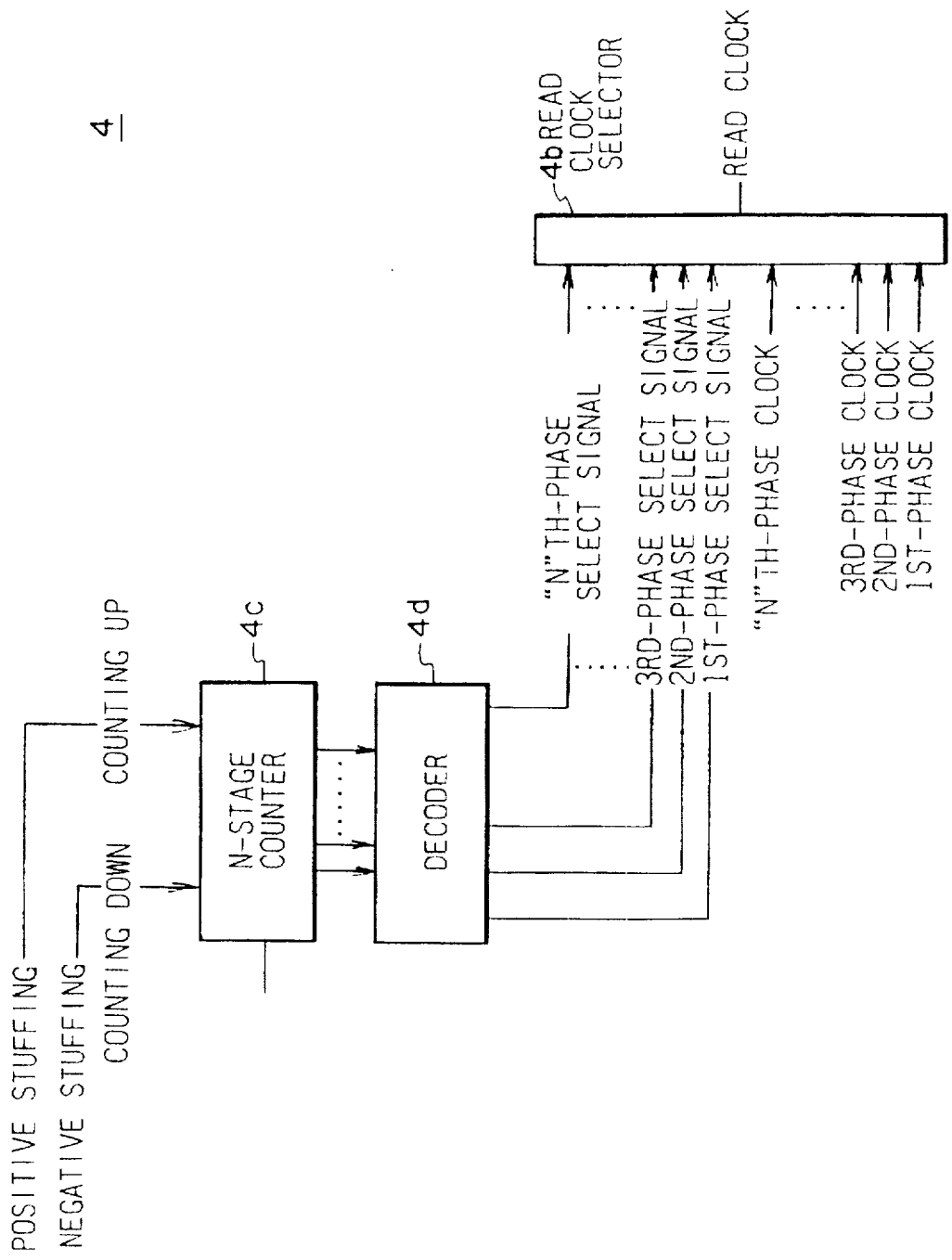
FIG. 20 is a block diagram showing the principle of a second example of a read clock generator in a jitter suppression circuit according to the present invention.

FIG. 20 is a block diagram showing the principle of a second example of a read clock generator for a jitter suppression circuit according to the present invention.

The read clock generator 4 has an N-stage counter 4c, a decoder 4d, and a read selector 4b. The N-stage counter 4c counts up to N in response to positive stuffing signals I and counts down to 0 in response to negative stuffing signals D. The decoder 4d decodes the outputs of the N-stage counter 4c, to provide N select signals, i.e., a 1st-phase select signal to an Nth-phase select signal. The read selector 4b is the same as that of FIG. 19. The read selector 4b sequentially selects N clock signals, i.e., a 1st-phase clock signal to an Nth-phase clock signal and provides them as read clock signals one by one.

When the read clock generator 4 of FIG. 20 receives a positive stuffing signal, the N-stage counter 4c increments 1 toward N (circulating from N to 1). The decoder 4d sequentially generates the 1st-phase select signal to the Nth-phase select signal. As a result, the 1st-phase clock signal to the Nth-phase clock signal are sequentially selected to delay the phase by 1/N each time.

When the read clock generator 4 of FIG. 20 receives a negative stuffing signal, the counter 4c decrements 1 toward 1 (circulating from 1 to N). The decoder 4d sequentially generates Nth- to 1st-phase select signals, to select the Nth- to 1st-phase clock signals (circulating from the 1st to the Nth) one by one. As a result, the phase is delayed by 1/N whenever the clock signals are switched from one to another.

FIG. 21 is a block diagram showing a read clock generator for a jitter suppression circuit according to an embodiment of the present invention. This read clock generator is based on the first example of FIG. 19.

The read clock generator 4 has an N-stage ring counter 4a, two NAND gates 41a and 42a, and a read selector 4b. The NAND gate 41a receives 1st-phase to N-1th-phase select signals from the ring counter 4a. The output of the NAND gate 41a is connected to the right input of the N-stage ring counter 4a. The NAND gate 42a receives 2nd-phase to Nth-phase select signals from the N-stage ring counter 4a. The output of the NAND gate 42a is connected to the left input of the ring counter 4a.

The N-stage ring counter 4a is shifted to the right in response to a positive stuffing signal I and to the left in response to a negative stuffing signal D, to provide N select signals, i.e., the first-phase to Nth-phase select signals. The read selector 4b receives the N select signals from the ring counter 4a and sequentially selects the N clock signals, i.e., the 1st-phase to Nth-phase clock signals, to provide read clock signals one by one.

Figure 22A:
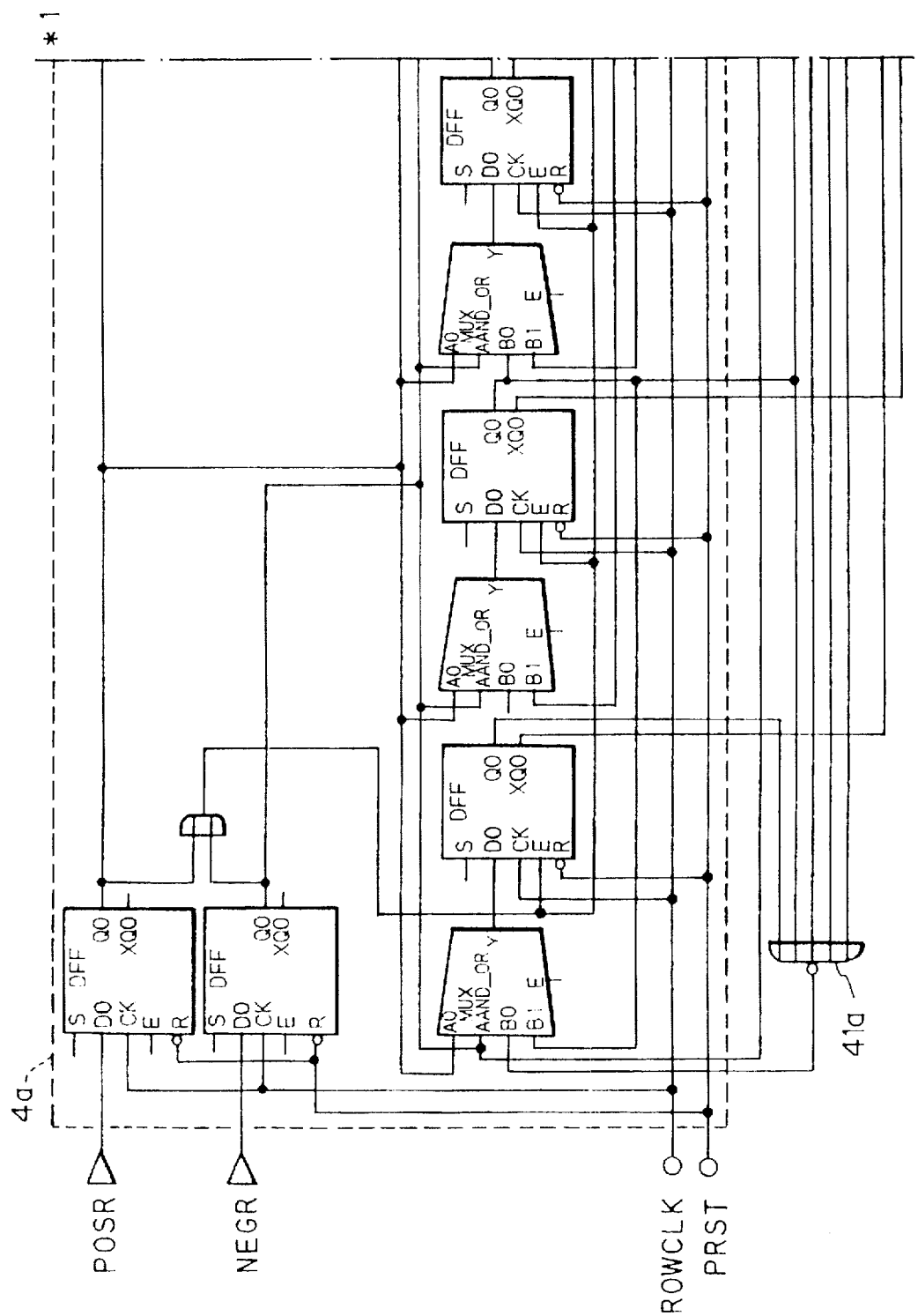
FIGS. 22A, 22B, and 22C are circuit diagrams showing a concrete example of a ring counter combined in a read clock generator of a jitter suppression circuit according to the present invention.
Figure 22B:
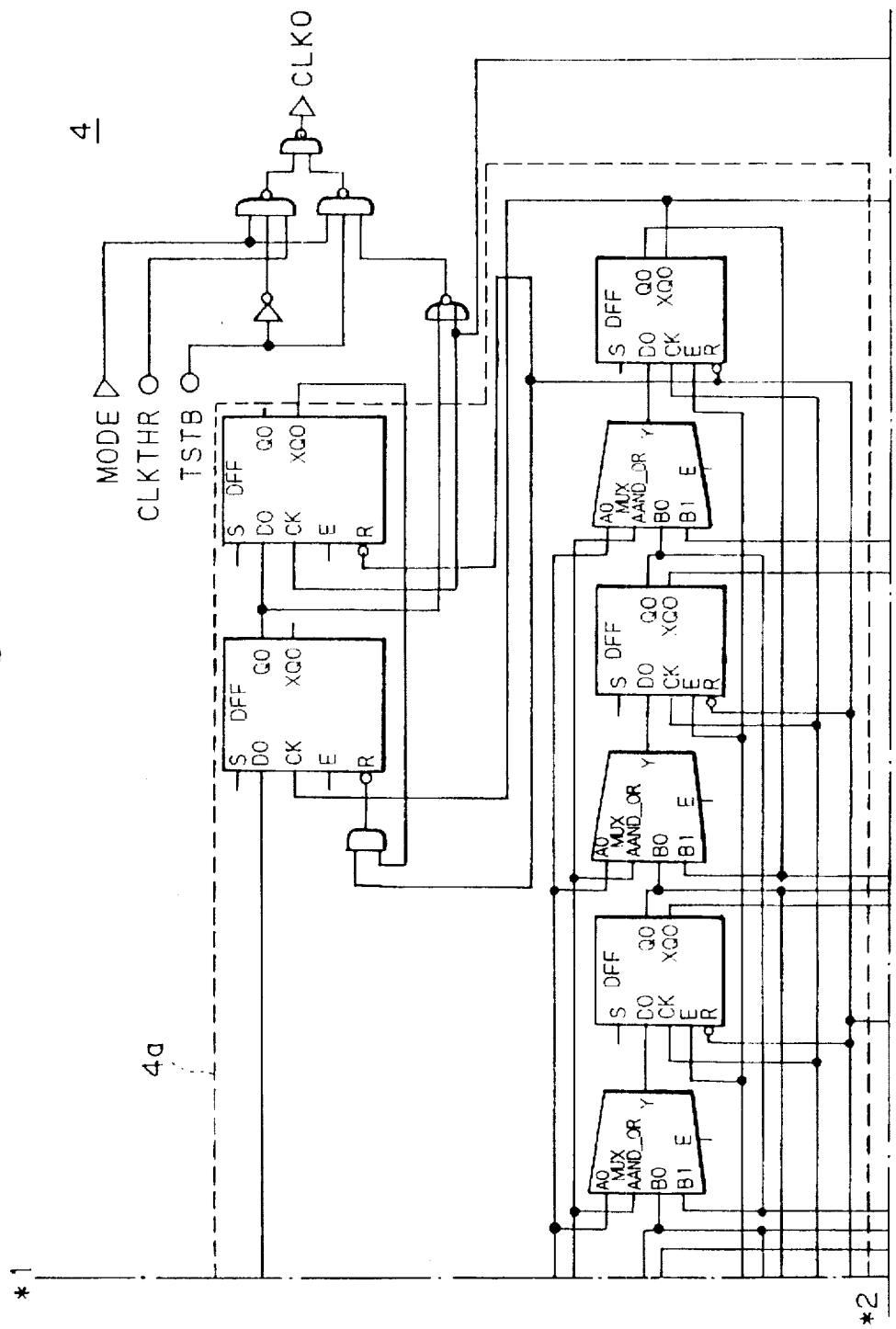
Figure 22C:
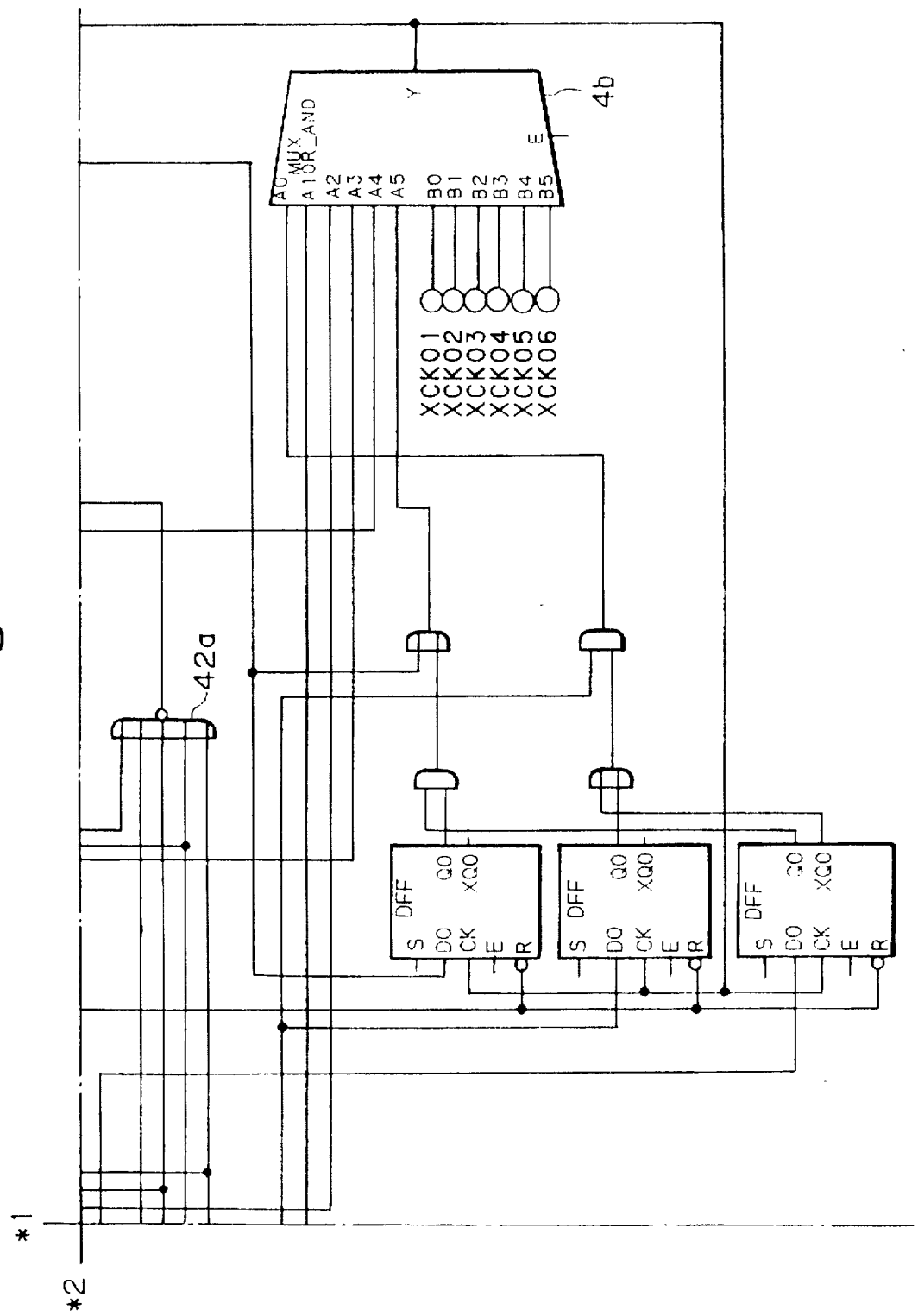

FIGS. 22A to 22C are circuit diagrams showing a concrete example of a ring counter combined the ring counter in a read clock generator of a jitter suppression circuit according to the present invention. The six-stage ring counter 4a provides six select signals, i.e., 1st-phase to 6th-phase select signals to sequentially select six clock signals, i.e., a 1st-phase clock signal XCK01 to an Nth-phase clock signal XCK06.

In FIGS. 22A to 22C, the six-stage ring counter 4a has multiplexers (MUXs), D-type flip-flops, and logic gates. The ring counter 4a receives a positive stuffing signal POSR, a negative stuffing signal NEGR, an overhead clock signal ROWCLK, and a reset signal PRST. The NAND gates 41a and 42a are five-input NAND gates. The NAND gate 41a receives the 1st-phase to 5th-phase select signals, and the NAND gate 42a receives the 2nd-phase to 6th-phase select signals. The output of the NAND gate 41a is connected to the right input of the 6-stage ring counter 4a, and the output of the NAND gate 42a is connected to the left input of the 6-stage ring counter 4a.

The read selector 4b receives the six select signals, i.e., the 1st-phase to 6th-phase select signals from the ring counter 6a and sequentially selects the six clock signals, i.e., the 1st-phase to 6th-phase clock signals, to provide read clock signals one by one. The 1st-phase to 6th-phase clock signals are provided by the N-phase clock generator 6.

As explained above, the jitter suppression circuit according to the present invention masks clock signals corresponding to overhead bytes among the received clock signals. According to the resultant signals, the N-phase clock generator 6 generates six-phase clock signals by dividing the period of the clock signals by six. The byte-bit converter 3 prepares bit stuffing signals, which are supplied to the read clock generator 4 to generate six select signals, i.e., 1st-phase to 6th-phase select signals for selecting the six clock signals, i.e., the 1st-phase to 6th-phase clock signals. The 1st-phase to 6th-phase clock signals are sequentially selected by the 1st-phase to 6th-phase select signals according to the bit stuffing signals, to provide read clock signals shifted at intervals of ⅙ phases, one by one for the buffer memory 2.

In the jitter suppression circuit according to the present invention, the write clock generator receives data and clock signals, masks clock signals corresponding to overhead signals among the received clock signals, carries out positive or negative stuffing according to a byte stuffing signal contained in the received data signals, and generates clock signals corresponding only to main signals contained in the received data signals. The buffer memory stores data related to the main signals according to the clock signals provided by the write clock generator.

The byte-bit converter has an accumulator and a distributor. The accumulator accumulates bits related to the positive or negative stuffing according to the byte stuffing signal. The distributor uniformly distributes the accumulated bits according to a moving average for a predetermined period, to generate smoothed bit stuffing signals. The clock mask masks clock signals corresponding to overhead bytes among the received clock signals.

The N-phase clock generator 6 divides the period of the output clock signal of the clock mask by N, to generate N-phase clock signals. The read clock generator sequentially selects the N-phase clock signals according to the bit stuffing signals, to generate clock signals for reading the buffer memory. The smoothing unit reads the data stored in the buffer memory according to the clock signals provided by the read clock generator while smoothing the masked clock signals corresponding to the overhead bytes, and saves the smoothed read data for an asynchronous transmission network. The byte-bit converter according to the present invention is capable of converting byte stuffing signals into bit stuffing signals without using a digital PLL.

As explained above in detail, the jitter suppression circuit according to the present invention adjusts a phase shift due to byte stuffing according to bit stuffing carried out at intervals of 1/N phases, to thereby reduce phasic variations due to the bit stuffing and to suppress jitter.

Many different embodiments of the present invention may be constructed without departing from the spirit and scope of the present invention, and it should be understood that the present invention is not limited to the specific embodiments described in this specification, except as defined in the appended claims.

What is claimed is:

1. A jitter suppression circuit for a synchronous transmission network, comprising:

a write clock generator for masking clock signals corresponding to overhead signals among received data and clock signals, carrying out positive or negative stuffing according to a byte stuffing signal contained in the received data signals, and generating clock signals corresponding only to main signals contained in the received data signals;

a buffer memory for storing data related to the main signals in response to the clock signals generated by said write clock generator;

a byte-bit converter having an accumulator for accumulating bits related to the positive or negative stuffing according to the byte stuffing signal and a distributor for distributing the accumulated bits according to a moving average for a predetermined period, to generate smoothed bit stuffing signals;

a clock mask for masking clock signals corresponding to overhead bytes among the received clock signals;

an N-phase clock generator for dividing the period of the output clock signal of said clock mask by N, to generate N-phase clock signals;

a read clock generator for sequentially selecting the N-phase clock signals according to the bit stuffing signals, to generate clock signals for reading said buffer memory; and a smoothing unit for reading the data stored in said buffer memory according to the clock signals generated by said read clock generator while smoothing the masked clock signals corresponding to the overhead signals, and saving the smoothed read data for an asynchronous transmission network.

2. A jitter suppression circuit as claimed in claim 1, wherein said N-phase clock generator includes:

a phase delay unit having gates for delaying the phase of an input clock signal;

a frequency divider for halving the frequency of the output of each of predetermined ones of the gates of said phase delay unit;

a phase detector for detecting any of the gates that provides a clock signal that is delayed behind the input clock signal by one period of the input clock signal or more;

a select signal generator for converting only a first detected output from said phase detector into a select signal; and an N-phase clock selector for selecting, according to the select signal, those of the gates that divide the period of the input clock signal into N phases.

3. A jitter suppression circuit as claimed in claim 2, wherein said N-phase clock generator further has a select signal processor for adjusting the select signal of said select signal generator according to the position of the overhead bytes.

4. A jitter suppression circuit as claimed in claim 2, wherein said N-phase clock generator further has a phase determination circuit disposed on the output side of said phase detector, to prevent providing a plurality of detected outputs.

5. A jitter suppression circuit as claimed in claim 1, wherein said N-phase clock generator includes:

a phase delay unit having gates for delaying the phase of an input clock signal;

a frequency divider for halving the frequency of the output of each of predetermined ones of the gates of said phase delay unit;

a phase detector for detecting any of the gates that provides a clock signal that is delayed behind the input clock signal by half the period of the input clock signal or more;

a select signal generator for converting only a first detected output from said phase detector into a select signal; and an N-phase clock selector for selecting, according to the select signal, those of the gates that divide the period of the input clock signal into N phases.

6. A jitter suppression circuit as claimed in claim 4, wherein said N-phase clock generator further has a select signal processor for adjusting the select signal of said select signal generator according to the position of the overhead bytes.

7. A jitter suppression circuit as claimed in claim 4, wherein said N-phase clock generator further has a phase determination circuit disposed on the output side of said phase detector, to prevent providing a plurality of detected outputs.

8. A jitter suppression circuit as claimed in claim 1, wherein said read clock generator includes:

an N-stage ring counter shiftable to the right and left, operating in response to the bit stuffing signals; and a selector for selecting the N-phase clock signals one by one according to the output of said ring counter, to sequentially generate read clock signals.

9. A jitter suppression circuit as claimed in claim 1, wherein said read clock generator includes:

an N-stage up/down counter operating in response to the bit stuffing signals;

a decoder for decoding the output of said counter; and a selector for selecting the N-phase clock signals one by one according to the output of said decoder, to sequentially generate read clock signals.

10. An N-phase clock generator for dividing the period of a clock signal by N, to generate N-phase clock signals, comprising:

a phase delay unit having gates for delaying the phase of an input clock signal;

a frequency divider for halving the frequency of the output of each of predetermined ones of the gates of said phase delay unit;

a phase detector for detecting any of the gates that provides a clock signal that is delayed behind the input clock signal by one period of the input clock signal or more;

a select signal generator for converting only a first detected output from said phase detector into a select signal; and an N-phase clock selector for selecting, according to the select signal, those of the gates that divide the period of the input clock signal into N phases.

11. An N-phase clock generator as claimed in claim 10, wherein said N-phase clock generator further comprises a select signal processor for adjusting the select signal of said select signal generator according to a predetermined input clock signal.

12. An N-phase clock generator as claimed in claim 10, wherein said N-phase clock generator further comprises a phase determination circuit disposed on the output side of said phase detector, to prevent providing a plurality of detected outputs.

13. An N-phase clock generator for dividing the period of a clock signal by N, to generate N-phase clock signals, comprising:

a phase delay unit having gates for delaying the phase of an input clock signal;

a frequency divider for halving the frequency of the output of each of predetermined ones of the gates of said phase delay unit;

a phase detector for detecting any of the gates that provides a clock signal that is delayed behind the input clock signal by half the period of the input clock signal or more;

a select signal generator for converting only a first detected output from said phase detector into a select signal; and an N-phase clock selector for selecting, according to the select signal, those of the gates that divide the period of the input clock signal into N phases.

14. An N-phase clock generator as claimed in claim 13, wherein said N-phase clock generator further comprises a select signal processor for adjusting the select signal of said select signal generator according to the position of overhead bytes.

15. An N-phase clock generator as claimed in claim 13, wherein said N-phase clock generator further comprises a phase determination circuit disposed on the output side of said phase detector, to prevent providing a plurality of detected outputs.

* * * * *